US007364272B2

(12) United States Patent
Furukawa et al.

(10) Patent No.: US 7,364,272 B2
(45) Date of Patent: Apr. 29, 2008

(54) PRINTING HEAD, HEAD CARTRIDGE HAVING PRINTING HEAD, PRINTING APPARATUS USING PRINTING HEAD, AND PRINTING HEAD SUBSTRATE

(75) Inventors: Tatsuo Furukawa, Kanagawa (JP); Hiroyuki Maru, Kanagawa (JP); Takashi Yoshida, Tokyo (JP); Kazuki Ohta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 11/106,459

(22) Filed: Apr. 15, 2005

(65) Prior Publication Data

US 2005/0185023 A1 Aug. 25, 2005

Related U.S. Application Data

(62) Division of application No. 09/374,580, filed on Aug. 16, 1999, now Pat. No. 7,101,099.

(30) Foreign Application Priority Data

Aug. 19, 1998 (JP) ................................ 10-233213
Sep. 4, 1998 (JP) ................................ 10-251479
Jul. 12, 1999 (JP) ................................ 11-198095

(51) Int. Cl.
*B41J 2/05* (2006.01)
*B41J 29/38* (2006.01)
*G06K 15/02* (2006.01)

(52) U.S. Cl. ............................ 347/61; 347/9; 347/10; 347/14; 358/1.2; 358/1.4

(58) Field of Classification Search .................. 347/14
See application file for complete search history.

(56) References Cited

U.S. PATENT DOCUMENTS 4,313,124 A 1/1982 Hara (Continued)

FOREIGN PATENT DOCUMENTS

EP 0 571 093 11/1993

(Continued)

OTHER PUBLICATIONS

Patent Abstracts of Japan, vol. 1996, No. 06, Jun. 28, 1996 (JP 08-034137, Feb. 6, 1996).

*Primary Examiner*—Matthew Luu
*Assistant Examiner*—Lisa M Solomon
(74) *Attorney, Agent, or Firm*—Fitzpatrick, Cella, Harper & Scinto

(57) ABSTRACT

A printing head which outputs an output from a sensor device provided for monitoring various condition of a printing head as digital data, and a printing apparatus using the printing head. The output from the device for detecting condition of the printing head, e.g., information indicative of a substrate temperature, a resistance value of an electrothermal transducer, an ON resistance value of a power transistor which drives the electrothermal transducer and the like is digitized on the substrate, and outputted as digital information to the outside. Further, the digital information is outputted by utilizing a clock signal and a latch signal used for transferring print data to the printing head. This does not increase the number of wires and the area of the substrate.

2 Claims, 26 Drawing Sheets

U.S. PATENT DOCUMENTS

| | | | | |
|---|---|---|---|---|
| 4,345,262 | A | 8/1982 | Shirato et al. | |
| 4,459,600 | A | 7/1984 | Sato et al. | |
| 4,463,359 | A | 7/1984 | Ayata et al. | |
| 4,542,385 | A | 9/1985 | Jinnai et al. | |
| 4,558,333 | A | 12/1985 | Sugitani et al. | |
| 4,608,577 | A | 8/1986 | Hori | |
| 4,723,129 | A | 2/1988 | Endo et al. | |
| 4,740,796 | A | 4/1988 | Endo et al. | |
| 5,387,834 | A | 2/1995 | Suzuki | |
| 5,602,576 | A | 2/1997 | Murooka et al. | |
| 5,731,828 | A | 3/1998 | Ishinaga et al. | |
| 5,781,205 | A | 7/1998 | Silverbrook | |
| 5,838,341 | A | 11/1998 | Hiwada | |
| 5,851,075 | A | 12/1998 | Imai | |
| 5,880,762 | A | 3/1999 | Ishinaga et al. | |
| 5,886,713 | A | 3/1999 | Okada et al. | |
| 5,892,532 | A | 4/1999 | Katakura et al. | |
| 5,920,331 | A | 7/1999 | Silverbrook | |
| 5,956,052 | A | 9/1999 | Udagawa et al. | |
| 5,969,730 | A | 10/1999 | Inose et al. | |
| 6,036,297 | A | 3/2000 | Hayasaki | |
| 6,116,714 | A | 9/2000 | Imanaka et al. | |
| 6,120,198 | A * | 9/2000 | Sawano et al. | 400/120.05 |
| 6,231,153 | B1 | 5/2001 | Elgee | |
| 6,290,334 | B1 | 9/2001 | Ishinaga et al. | |

FOREIGN PATENT DOCUMENTS

| | | |
|---|---|---|
| EP | 0 631 870 | 1/1995 |
| EP | 0 661 162 | 7/1995 |
| EP | 0 694 391 | 1/1996 |
| EP | 0 720 917 | 7/1996 |
| EP | 0 255 116 | 3/1998 |
| JP | 54-56847 | 5/1979 |
| JP | 59-123670 | 7/1984 |
| JP | 59-138461 | 8/1984 |
| JP | 60-71260 | 4/1985 |
| JP | 61-008364 | 1/1986 |
| JP | 03-140252 | 6/1991 |
| JP | 05-185594 | 7/1993 |
| JP | 06-24028 | 2/1994 |
| JP | 07-052387 | 2/1995 |
| JP | 08-034137 | 2/1996 |
| JP | 08-072310 | 3/1996 |
| JP | 08-118647 | 5/1996 |
| JP | 08-127140 | 5/1996 |
| JP | 08-156257 | 6/1996 |
| JP | 08-187854 | 7/1996 |
| JP | 08-244231 | 9/1996 |
| JP | 08-252926 | 10/1996 |
| JP | 09-131879 | 5/1997 |

* cited by examiner

FIG. 11A

| TEMPERATURE | HEAT PULSE WIDTH |
|---|---|
| I | Th × 1.06 |
| II | Th × 1.04 |
| III | Th × 1.02 |
| IV | Th |
| V | Th × 0.98 |
| VI | Th × 0.96 |
| VII | Th × 0.94 |
| VIII | Th × 0.92 |

FIG. 11B

| | | HEATER RESISTANCE RANK | | | | | | | |
|---|---|---|---|---|---|---|---|---|---|
| | | I | II | III | IV | V | VI | VII | VIII |
| TRANSISTOR ON RESISTANCE RANK | I | Th×0.93 | Th×0.94 | Th×0.95 | Th×0.96 | Th×0.97 | Th×0.98 | Th×0.99 | Th |
| | II | Th×0.94 | Th×0.95 | Th×0.96 | Th×0.97 | Th×0.98 | Th×0.99 | Th | Th×1.01 |
| | III | Th×0.95 | Th×0.96 | Th×0.97 | Th×0.98 | Th×0.99 | Th | Th×1.01 | Th×1.02 |
| | IV | Th×0.96 | Th×0.97 | Th×0.98 | Th×0.99 | Th | Th×1.01 | Th×1.02 | Th×1.03 |
| | V | Th×0.97 | Th×0.98 | Th×0.99 | Th | Th×1.01 | Th×1.02 | Th×1.03 | Th×1.04 |
| | VI | Th×0.98 | Th×0.99 | Th | Th×1.01 | Th×1.02 | Th×1.03 | Th×1.04 | Th×1.05 |
| | VII | Th×0.99 | Th | Th×1.01 | Th×1.02 | Th×1.03 | Th×1.04 | Th×1.05 | Th×1.06 |
| | VIII | Th | Th×1.01 | Th×1.02 | Th×1.03 | Th×1.04 | Th×1.05 | Th×1.06 | Th×1.07 |

1115 ROM DATA OUTPUT
1139
×10
1114'
1107'
ROM1
ROM2
ROM3
ROM4
ROM5
ROM6
ROM7
ROM8
ROM9
OUT ROM0 IN
S/R0 IN OUT DK IDK LD
S/R1
S/R2
S/R3
S/R4
S/R5
S/R6
S/R7
S/R8
S/R9
1260
1261
1262
1263
STARTER LD OUT IN
1140
1101
1102
1103
DCLK
LD
1116
1117
1118
1119
1120
1121
1122
1123
1124
Vref
1125
1126
1127
1128
1129
1130
1131
1132
1133
1134
1135
1137
DIGITAL OUTPUT
ANALOG SIGNAL (ALG)
VH
1150 HEATER
1151 SWITCH
1152
1153
HEAT
1154
LATCH
S/R
1156
DATA
1157

PRINTING HEAD, HEAD CARTRIDGE HAVING PRINTING HEAD, PRINTING APPARATUS USING PRINTING HEAD, AND PRINTING HEAD SUBSTRATE

This is a divisional application of application Ser. No. 09/374,580, filed Aug. 16, 1999 now U.S. Pat. No. 7,101, 099.

BACKGROUND OF THE INVENTION

The present invention relates to a printing head, a head cartridge having the printing head, a printing apparatus using the printing head and a printing head substrate, and more particularly, to data transmission/reception between a printing head and a printing apparatus using the printing head.

DESCRIPTION OF RELATED ART

Electrothermal transducers (heaters) of a printing head mounted on a printing apparatus according to a conventional ink-jet method and a driver which drives the electrothermal transducers in accordance with an input image signal are formed on one substrate by using a semiconductor process technique, as disclosed in Japanese Published Unexamined Patent Application No. Hei 5-185594. Further, it has been proposed to form a device to detect condition of the substrate such as temperature of the substrate, distribution of resistance values and variation of characteristic of the driver, on the same substrate.

FIG. 8 is a block diagram conceptually showing a method for detecting the condition of a substrate in a conventional ink-jet printing head.

In FIG. 8, reference numeral 101 denotes a semiconductor substrate or a base plate (hereinbelow referred to as "substrate") constructing a printing head; 102, a heater array having a plurality of electrothermal transducers (heaters) to generate thermal energy necessary for discharging ink; 103, a heater of the heater array 102; 104, a power transistor block to drive the heater by supplying a desired current to the heater; 105, a logic circuit comprising a latch circuit, a shift register and the like, for ON/OFF controlling the respective heaters in accordance with data transfer from the outside of the printing head; 106, a power source line for applying a predetermined voltage to the heaters, thus supplying the current to the heaters; 107, a GND line which the current that flowed through the heaters and the power transistor enters; and 108 and 109, a GND terminal and a power source terminal for leading the power source line to the outside of the printing head.

Further, numeral 410 denotes a temperature detection device for detecting the temperature of the substrate 101; 411, wiring for transmitting a signal from the temperature detection device 410; 412, a terminal for leading the signal from the temperature detection device 410 to the outside of the printing head; 420, a resistor for monitoring a resistance value of the electrothermal transducers formed on the substrate; 421, wiring for applying a voltage to the resistor 420 to measure a resistance value of the resistor; 422, a terminal for leading the wiring 421 to the outside of the printing head; 430, a signal processor block for processing an output from the temperature detection device and that from the resistance value monitor resistor; 413 and 423, wiring for connecting the temperature detection device 410 and the resistor 420 with the signal processor block 430; 440, a judgment circuit block for receiving an output from the signal processor block 430 to detect the condition of the substrate and feeding back appropriate control in accordance with the detected condition to the substrate; 450, wiring connecting the signal processor block 430 with the judgment circuit block 440; and 460, wiring connecting the judgment circuit block 440 with the logic circuit 105 in the substrate.

Next, the conception of control in accordance with substrate temperature detection and a detected temperature in the conventional printing head will be described with reference to FIG. 8.

The power transistor supplies a current for generating thermal energy necessary for ink discharge to the heater array 102. The timing of current supply is as follows. The judgment circuit block 440 determines an optimum driving method and the like corresponding to the condition of the substrate at that time, then a control signal according to the determined driving method is sent to the logic circuit 105, and the logic circuit 105 supplies the control signal to a control terminal of the power transistor.

At this time, the amount and period of heat generation by the heater are determined by the timing of current that flows through the heater, and ink corresponding to the amount is discharged for the period. However, as the heat generation energy by the heater is supplied not only to the ink but also to the substrate 101, the temperature of the substrate 101 rises. Accordingly, ink discharge cannot be performed on a constant condition. That is, it is difficult to maintain the same ink discharge condition in a wide temperature range at constant drive timing. For this reason, there is a need to drive the heaters while detecting the substrate temperature and selecting an optimum ink discharge condition.

Preferably, the device to monitor a temperature change in the substrate has a known temperature characteristic. For example, a P-n junction diode is employed and its forward voltage-current characteristic or the like is utilized. Stable ink discharge can be maintained in a wide temperature range by providing the diode on the substrate, detecting the change of characteristic of the device at predetermined intervals from an external position, and supplying optimum drive timing corresponding to each detected result.

That is, in FIG. 8, a predetermined voltage is applied to the power source terminal 109 in advance, then if a timing pulse based on print information and driving condition is inputted from the logic circuit 105 into the power transistor block 104, a corresponding heater 103 in the heater array 102 is driven, and a nozzle at a specific position corresponding to the driven heater discharges ink.

At this time, if heat generation operation with respect to the heater is continuously repeated, the temperature of the substrate rises corresponding to the heat generation operation. The temperature detection device 410 sends an output signal corresponding to the temperature of the substrate, via the substrate internal wiring 411 and the terminal 412 and the substrate external wiring 413, to the signal processor block 430 on the printing apparatus side. Generally, the output from the temperature detection device 410 is an analog signal. The signal processor block 430 amplifies the analog signal, converts the output into a digital value, and sends the digital vale via the wiring 450 to the judgment circuit block 440.

The judgment circuit block 440 detects the temperature rise of the substrate 101 by the digital value, and sends a driving signal indicative of an optimum driving condition at the temperature via the wiring 460 to the logic circuit 105. The logic circuit 105 supplies a timing pulse corresponding to the substrate temperature to the power transistor, and as a result, the heater is driven and ink is discharged.

In this manner, even if the substrate temperature changes, a stable ink discharge condition can be maintained by detecting the substrate temperature at predetermined intervals.

Next, the conception of monitoring of resistance value of the electrothermal transducer (heater) formed on the substrate in the conventional printing head and control in accordance with the result of monitoring will be described.

In the ink-jet printing head, upon printing, heat generated by the heater 103 boils ink, and the ink is discharged by a pressure of bubble generated by boiling. The quantity of heat (Q) generated at this time is expressed by $Q=I^2R$ with the current (I) which flows the heater and the resistance-value (R) of the heater. According to the relation between the quantity of heat (Q) and the resistance value (R), the quantity of heat (Q) changes based on the resistance value (R) of the heater itself, and the formation of bubble changes in correspondence with the change of the quantity of heat (Q).

When the printing head is exchanged for a new one, the quantity of heat (Q) depends on the resistance value of the heater of the new printing head. However, as the heater resistance value varies by each heater, if the heaters are always driven on the same driving condition, the quantity of heat changes, and uniform printing cannot be performed. Generally, if the heaters comprise a metal or metal alloy thin film resistor formed by a semiconductor process, the manufacture-caused variation is about ±20%.

For this reason, there is a need to maintain stable ink discharge with respect to the variation of resistance value by detecting the resistance values of the respective heaters of the printing head and supplying optimum timing for each heater from an external device.

That is, in FIG. 8, a device of the resistor 420 used for monitoring the heater resistance value is formed with the same material as that of the actually-heat generating heater 103 and by the same process as that of the heater. The resistance value of the heater is read by the signal processor block 430 via the internal wiring 421 and the terminal 422 of the substrate and the external wiring 423.

The output from the resistor 420 to the outside of the printing head is an analog signal. The signal processor block 430 amplifies the analog signal, then converts the output into a digital value, and sends the digital value via the wiring 450 to the judgment circuit block 440. The judgment circuit block 440 detects the heater resistance value by the digital value, and feeds back a driving signal indicative of optimum driving condition corresponding to the resistance value via the wiring 460 to the logic circuit 105.

Thus, even if the heaters have different resistance values, a stable ink discharge condition can be maintained by performing the above control when the printing head is exchanged for new one, or when the power of the printer main body is turned on.

Further, it has been proposed to transmit printing head ID (identification) information for drive control change, rank information for determination of printing parameters, and the like, as well as the temperature of the substrate as described above, from the printing head to the apparatus main body.

However, in the above conventional art, the information indicative of detected substrate temperature and information indicative of monitored heater resistance value are outputted as analog signals from the substrate to an external device. Therefore, the above information is easily influenced by power source noise which occurs upon flow of a large current in synchronization with ink-discharge heat pulse, GND noise, coupling noise which enters the wiring toward the outside of the substrate, radiation noise and the like. Accordingly, the information cannot be precisely read.

Further, providing a noise eliminator, a device or the like to reduce the above noise increases the number of parts constituting the printing head and the space of substrate, thus increases costs. Further, to use the analog signals as control signals, it is necessary to convert the analog signals into digital values by an A/D converter then send the digital values to the judgment circuit. In this case, the A/D converter which must be provided at an external position of the printing head will make the configuration of the entire system complicated, and increases the costs.

Generally, signal transmission/reception between the printing head and the printing apparatus main body is performed by using input/output pads (PAD). However, the number of pads increases for transmission/reception of printing head identification information, rank information and the like as well as the above temperature information. This construction has the following drawbacks.

(1) As the number of pads increases, the area of substrate of the printing head increases, which increases the apparatus in size and costs.

(2) As the number of pointing wires for electrically connecting the pads to external contacts increases, the increase in printing head manufacturing steps leads to increase in the costs.

(3) The increase in the number of control signal lines disturbs cost reduction with simplification of substrate.

Especially, in a case where printing head identification information and/or rank information are transmitted to the apparatus main body side, the number of wires from the printing head to the main substrate of the apparatus main body increase in proportion to the amount of information, which increases contact portions (pads) and both substrate areas, and increases the costs.

Further, as the information which varies with time such as temperature information must be transmitted periodically even during a printing operation, the information is transmitted by using it's own transfer clock rather than using the clock for the printing data. For this purpose, the wiring for the clock is added to the wiring. At this time, as the transfer clock signal becomes a noise source with a print data clock, a wiring route for the clock must be considered for avoid generation of noise. Further, to reduce influence by generated noise, a special circuit and/or part may be necessary.

Further, generally, the temperature of the printing head is detected by using a comparator. However, as it takes time to change a reference voltage and start the comparator, if print data transfer from the printing apparatus is made at a high speed, the transfer of temperature data cannot be made on time.

Especially, if the speed of print data transfer from the printing apparatus is reduced to the same speed as the speed of temperature data transfer, such low speed cannot meet a recent requirement for high-speed printing. Further, although the reference voltage change and the operation of the comparator can be made at a high speed, as electric consumption at analog circuits to perform these operations increases, the electric consumption in printing stand-by condition (i.e., the condition where the temperature detection is not performed) becomes larger than that in digital circuits for receiving and storing print data.

To address this problem, it has been considered to control power supply to the analog circuits from the outside of the printing head, however, the voltage drop at a control circuit for ON/OFF controlling the power supply influences the precision of temperature detection, further, the number of signal lines connecting the printing head to the external devices increases.

SUMMARY OF THE INVENTION

Accordingly, an object of the present invention is to provide a printing head which has an increased noise-resistant characteristic in an output from a sensor device provided for monitoring various condition of the printing head and obtains more precise sensor output, further has a reduced number of circuits and/or devices for noise elimination, thus attaining cost reduction, and a printing apparatus using the printing head.

According to the present invention, the above object is attained by providing a printing head according to a first aspect of the present invention where an electrothermal transducer for generating thermal energy used for discharging ink and a driver for driving the electrothermal transducer are provided on a substrate, comprising: a sensor which detects the condition of the substrate and outputs an analog signal; and an A/D converter which converts the analog signal from the sensor into a digital value, wherein the sensor and the A/D converter are provided on the substrate.

The driver may include: a power transistor which drives the electrothermal transducer; a shift register in which print data to drive the power transistor is temporarily stored; and a latch circuit which latches the print data stored in the shift register.

Further, the condition of the substrate includes at least one of temperature of the substrate, a resistance value of the electrothermal transducer and an ON resistance value of the power transistor.

Preferably, the sensor has a p-n junction diode having a known temperature characteristic for detecting the temperature of the substrate, a resistor of the same material as that of the electrothermal transducer, formed by the same process as that of the electrothermal transducer, for detecting the resistance value of the electrothermal transducer, and a transistor of the same conduction type of that of the power transistor, formed by the same process as that of the power transistor, for detecting the ON resistance value of the power transistor.

Further, it is preferable to provide a nonvolatile memory in which digital information indicative of the resistance value of the electrothermal transducer, the ON resistance value of the power transistor and the like is stored, such as an EPROM, an EEPROM or a fuse ROM which does not change with time, on the substrate. Preferably, the digital information indicative of the resistance value of the electrothermal transducer and the digital information indicative of the ON resistance value of the power transistor, stored in the nonvolatile memory, were obtained by factory-shipment measurement.

In the printing head according to the first aspect of the present invention having the above construction, the output from the device for detecting the conditions of the printing head is digitized on the substrate, and the digital information is outputted to the outside.

Further, the above object is attained by a printing apparatus which performs printing by using the printing head having the above construction, and having control means for performing drive control on the printing head.

Further, the above object is attained by providing a printing head substrate having an electrothermal transducer for generating thermal energy used for discharging ink and a driver for driving the electrothermal transducer, comprising: a sensor which detects the condition of the substrate and outputs an analog signal; and an A/D converter which converts the analog signal from the sensor into a digital value, wherein the sensor and the A/D converter are provided on the substrate.

According to the first aspect of the present invention, as the output from the device for detecting the conditions of the printing head is digitized on the substrate, and the digital information is outputted to the outside. For example, the information indicative of the temperature of the substrate, the resistance value of the electrothermal transducer, the ON resistance of the power transistor which drives the electrothermal transducer and the like is sent to an external printing apparatus as digital values. Accordingly, the digital values are not easily influenced by power source noise, GND noise, coupling noise, radiation noise and the like when the digital values pass through wirings and the like. Thus, the precision in the signal reading is improved, and precise printing head drive control can be performed without influence by noise.

Further, an A/D converter or the like which conventionally converts analog signal from the printing head into digital information can be omitted from the main body of the printing apparatus.

Further, as noise elimination means to reduce the power source noise and GND noise is omitted, the entire construction and space of the apparatus can be simplified.

Further, another object of the present invention is to provide a printing head which can reduce the apparatus in size and production cost of the apparatus by reducing the number of pads on the substrate of the printing head, and a printing apparatus using the printing head.

The above object is attained by providing, printing head according to a second aspect of the present invention, which performs printing by discharging ink in accordance with an ink-jet method, comprising: a memory for storing printing characteristics of a plurality of printing elements for discharging ink; a converter which converts an analog signal into digital signal and outputs the digital signal; and a driver which drives the plurality of printing elements in accordance with an input print signal, wherein the printing characteristics are read from the memory by using a clock signal and a latch signal for inputting the print signal, and wherein the digital signal is outputted from the converter by using the clock signal.

Preferably, each of the plurality of printing elements driven by the driver comprises: a heater; a switch which ON/OFF controls energization of the heater; and a discharge nozzle which discharges ink heated by heat generation by the heater.

Preferably, the driver has a shift register and a latch circuit. Further, the driver has: a first input pad which inputs a heat pulse signal with respect to the heater; a second input pad which inputs a print signal into the shift register; a third input pad which inputs the clock signal; and a fourth input pad which inputs a latch signal with respect to the latch circuit.

On the other hand, it is preferable that the memory includes: a plurality of ROMs; and a plurality of shift registers one-to-one corresponding to the plurality of ROMs, wherein a read signal is outputted from the plurality of shift registers to the plurality of ROMs, in accordance with the clock signal inputted from the third input pad, such that information stored in the plurality of ROMs are sequentially outputted.

Further, the converter inputs the read signal outputted from the plurality of shift registers and generates a threshold signal for analog/digital conversion. Further, it may be arranged such that the converter has a reduction circuit which reduces a frequency of the read signal outputted from the plurality of shift registers. The converter performs analog/digital conversion on the analog signal, in accordance with the frequency reduced by the reduction circuit.

Note that as the analog signal, an output from a temperature sensor which measures an internal temperature of the printing head can be used.

Further, according to the second aspect of the present invention, as reading of printing characteristics of the plurality of printing elements to discharge ink stored in the memory and conversion of analog signal into digital data can be performed by utilizing the clock signal and the latch signal for the print signal, the number of signals inputted into the printing head can be reduced, and the number of pads necessary for inputting the signals can be reduced.

By this arrangement, the size of the substrate of the printing head can be reduced, and the size reduction and the reduction of the number of pads reduces circuit production cost.

Further, the reduction of the number of signals inputted into the printing head reduces the number of signal lines, which suppresses occurrence of noise, further prevents erroneous operation due to noise with the suppression of noise occurrence, thus maintains high-reliable operation of the printing head.

Still another object of the present invention is to provide a printing head which prevents increase in the number of wires and the substrate area even if the amount of information transmitted from the printing head to the apparatus main body increases, and which suppresses production cost, and a printing apparatus using the printing head.

The above object is attained by providing a printing head according to a third aspect of the present invention, which performs printing in accordance with an input print signal, comprising: a nonvolatile memory for storing information on the condition of the printing head; and output means for outputting the information stored in the memory in a serial format to outside of the printing head, by utilizing a clock signal and a latch signal used for inputting the print signal, within a period in which the print signal is inputted.

In this case, it may be arranged such that the printing head further comprises conversion means for converting the information on the condition of the printing head into digital data, and outputting the digital data in the serial format to outside of the printing head, by utilizing the clock signal and the latch signal used for inputting the print signal, within the period in which the print signal is inputted.

Preferably, identification information of the printing head is stored in the nonvolatile memory. The nonvolatile memory includes at least one of an EPROM, an EEPROM and a fuse ROM.

Preferably, the output means outputs the information stored in the memory bit by bit, in synchronization with the clock signal.

According to the third aspect of the present invention, the information from the printing head can be sequentially outputted as a digital signal in synchronization with a clock used for print data transfer. By this arrangement, it is not necessary to provide a D/A converter on the apparatus main body side, and further, even if the amount of information to be transmitted increases, the number of signal lines does not increase. Accordingly, the devices do not increase in size and costs. Further, the number of clock signals as noise sources is only one, which does not much influence the environment. Further, stable head information transfer can be performed by digital transfer.

Further, at the same time of printing, information acquisition can be made without limiting the period of data transfer, accordingly, high-speed printing and fine control utilizing the information transferred from the printing head can be performed.

Yet another object of the present invention is to provide a printing head which detects temperature information and transmit the information while allowing high-speed print data transfer, and a printing apparatus using the printing head.

The above object is attained by a printing head according to a fourth aspect of the present invention, which outputs temperature information in accordance with input of print data, comprising: a shift register which inputs print data in accordance with a first-frequency clock; a heater which is energized and generates heat in accordance with the print data; a temperature detector which detects an internal temperature of the printing head; and a frequency divider which divides a frequency of the first-frequency clock and generates a second-frequency clock, wherein the temperature detector outputs a signal indicative of a detected temperature in accordance with the second-frequency clock.

Preferably, the temperature detector has: a temperature sensor; a reference voltage generator which generates a reference voltage; a switching circuit which changes the reference voltage in accordance with the second-frequency clock; and a comparator which compares an output voltage from the temperature sensor with the reference voltage from the switching circuit, and outputs the result of comparison as a signal indicative of the detected temperature.

Preferably, the frequency divider divides the frequency of the first-frequency clock by two.

Preferably, the printing head further comprises a latch circuit which latches print data stored in the shift register.

According to the fourth aspect of the present invention; the print data is inputted into the shift register in accordance with the first-frequency clock, while the first-frequency clock is divided by two so as to generate the second-frequency clock. The temperature detector to detects the internal temperature of the printing head outputs the signal indicative of the detected temperature in accordance with the second-frequency clock. Even if the print data input speed for printing operation increases, the speed of output of the signal indicative of the detected temperature is low, the operation speed of the temperature detector may be low.

By this arrangement, it is not necessary to increase the operation speed of the temperature detector, and the cost necessary for the increase in the operation speed can be saved. Accordingly, cost-saving printing head temperature control and high-speed print data transfer can be attained.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11A and 11B are tables for determining a heat pulse width when a temperature, a heater resistance value and a transistor ON resistance value change within a predetermined range;

DETAILED DESCRIPTION OF THE PREFERRED EMBODIMENTS

Preferred embodiments of the present invention will now be described in detail in accordance with the accompanying drawings.

Note that "printing" in the present specification means applying an image having no meaning such as a pattern to a printing medium as well as applying an image having a meaning such as a character or a figure to a printing medium.

Further, the present invention is applicable to apparatuses such as a printer which performs printing on printing media such as paper, threads, fiber, fabric, leather, metals, plastic, glass, wooden materials and ceramics, a copying machine, a facsimile apparatus having a communication system, a printer system having a combination of a communication system and a printer, and a word processor having a printer, and further applicable to industrial printing apparatuses combined with various processing apparatuses.

Further, the expression "substrate" used hereinbelow means not only a silicon semiconductor substrate but also a substrate (or a base plate) where respective devices and wirings are provided thereon.

Further, the expression "on the substrate" used hereinbelow means not only a part on the substrate but also the surface and the inside of the substrate near the surface of the substrate. Further, the expression "built-in" in the present invention does not mean simply arranging respective devices on the substrate, but means integrally forming the respective devices on the substrate by semiconductor-circuit manufacturing process or the like.

First, a typical structure and control construction of a printing apparatus using a printing head according to the present invention will be described.

Figure 1:
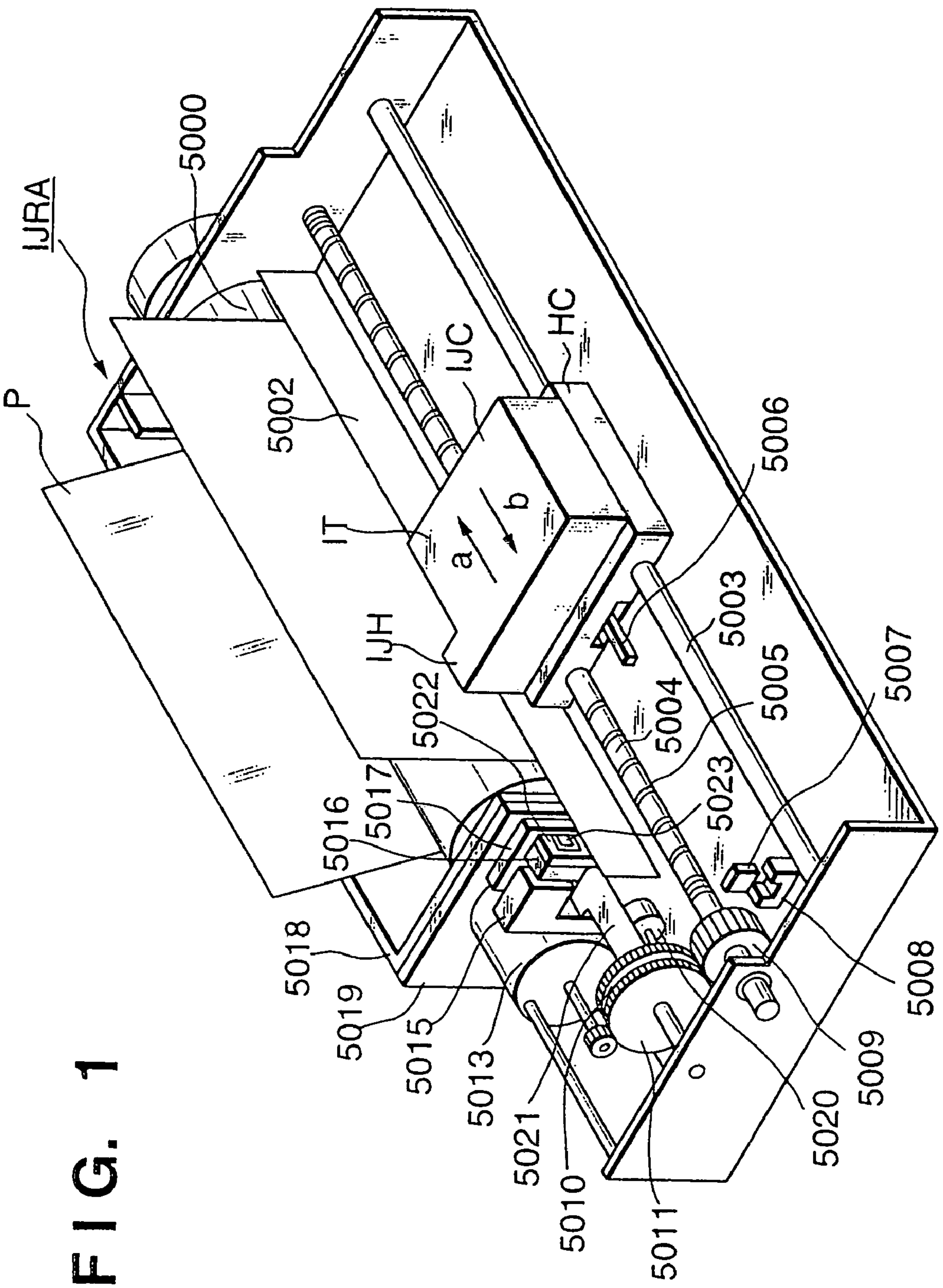
FIG. 1 is a perspective view showing the schematic structure of an ink-jet printer IJRA as a typical embodiment of the present invention.

FIG. 1 is a perspective view showing the outer appearance of an ink-jet printer IJRA as a typical embodiment of the present invention. Referring to FIG. 1, a carriage HC engages with a spiral groove 5004 of a lead screw 5005, which rotates via driving force transmission gears 5009 to 5011 upon forward/reverse rotation of a drive motor 5013. The carriage HC has a pin (not shown), and is reciprocally moved in directions of arrows a and b in FIG. 1. An integrated ink-jet cartridge IJC which incorporates a printing head IJH and an ink tank IT is mounted on the carriage HC. Reference numeral 5002 denotes a sheet pressing plate, which presses a paper sheet against a platen 5000, ranging from one end to the other end of the scanning path of the carriage. Reference numerals 5007 and 5008 denote photocouplers which serve as a home position detector for recognizing the presence of a lever 5006 of the carriage in a corresponding region, and used for switching, e.g., the rotating direction of motor 5013. Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

Figure 2:
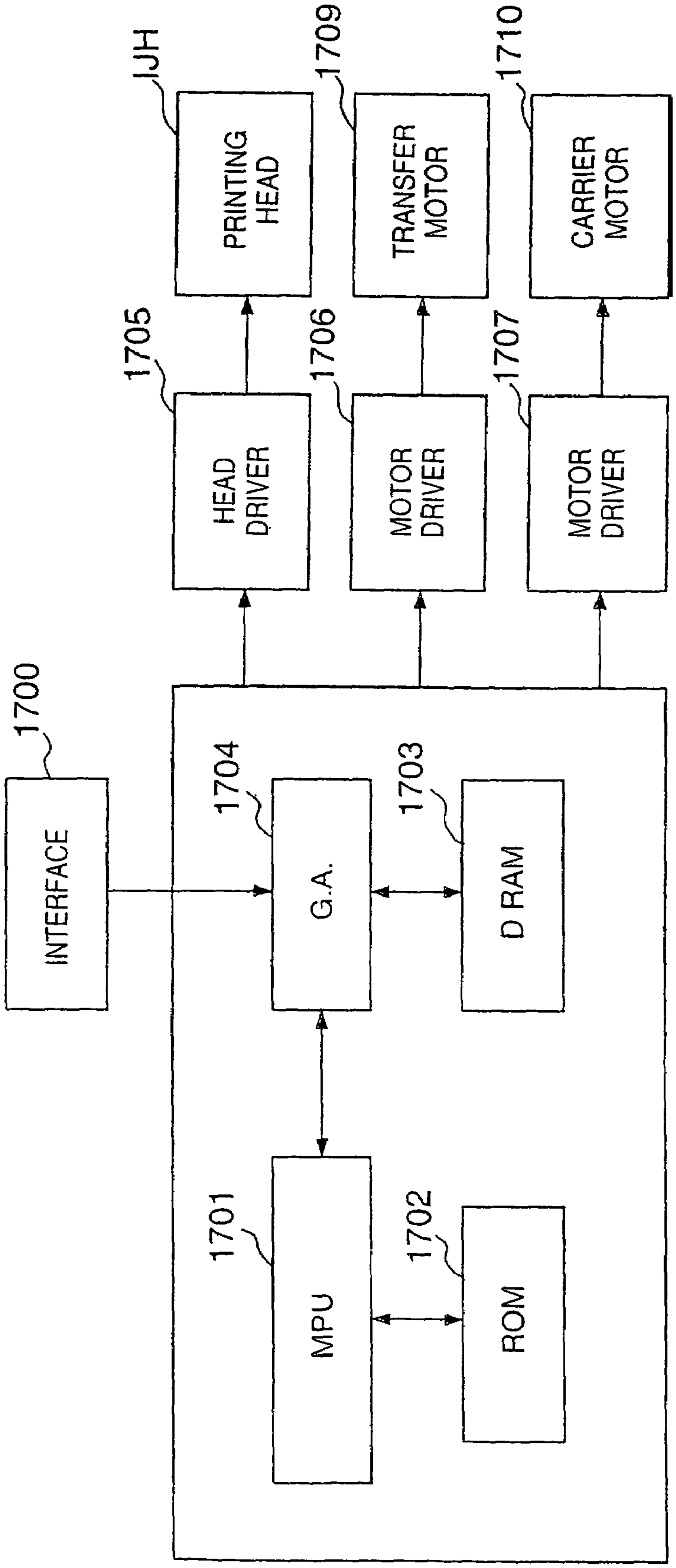
FIG. 2 is a block diagram showing the construction of a control circuit of the ink-jet printer IJRA.

FIG. 2 is a block diagram showing the arrangement of a control circuit of the ink-jet printer. Referring to FIG. 2 showing the control circuit, reference numeral 1700 denotes an interface for inputting a print signal from an external unit such as a host computer; 1701, an MPU; 1702, a ROM for storing a control program (including character fonts if necessary) executed by the MPU 1701; and 1703, a DRAM for storing various data (the print signal, print data supplied to the printing head and the like). Reference numeral 1704 denotes a gate array (G. A.) for performing supply control of print data to the printing head IJH. The gate array 1704 also performs data transfer control among the interface 1700, the MPU 1701, and the RAM 1703. Reference numeral 1710 denotes a carrier motor for transferring the printing head IJH in the main scanning direction; and 1709, a transfer motor for transferring a paper sheet. Reference numeral 1705 denotes a head driver for driving the printing head; and 1706 and 1707, motor drivers for driving the transfer motor 1709 and the carrier motor 1710.

The operation of the above control arrangement will be described below. When a print signal is inputted into the interface 1700, the print signal is converted into print data for a printing operation between the gate array 1704 and the MPU 1701. The motor drivers 1706 and 1707 are driven, and the printing head is driven in accordance with the print data supplied to the head driver 1705, thus performing the printing operation.

Note that the ink tank IT and the printing head IJH are integrally formed to construct an exchangeable ink cartridge IJC, however, the ink tank IT and the printing head IJH may be separately formed such that when ink is exhausted, only the ink tank IT can be exchanged for new ink tank.

Figure 3:
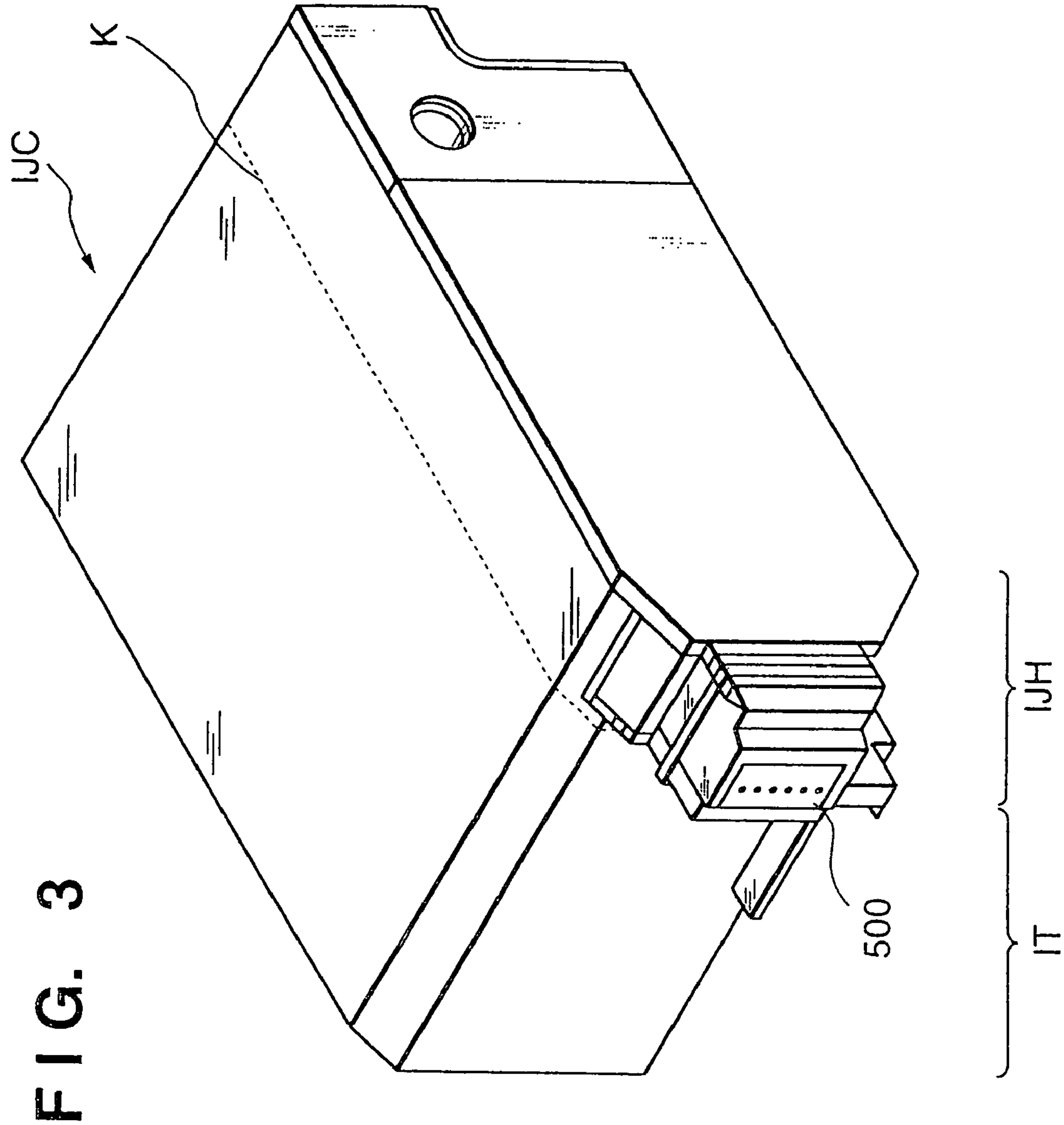
FIG. 3 is a perspective view showing the structure of an ink cartridge IJC where an ink tank and a head can be separated.

FIG. 3 is a perspective view showing the structure of the ink cartridge IJC where the ink tank and the head can be separated. As shown in FIG. 3 in the ink cartridge ITC, the ink tank IT and the printing head IJH can be separated along a line K. The ink cartridge IJC has an electrode (not shown) for receiving an electric signal supplied from the carriage HC side when it is mounted on the carriage HC. By the electric signal, the printing head IJH is driven as above, and discharges ink.

Note that in FIG. 3, numeral 500 denotes an ink-discharge orifice array. Further, the ink tank IT has a fiber or porous ink absorbing body. The ink is held by the ink absorbing body.

First Embodiment

Figure 4:
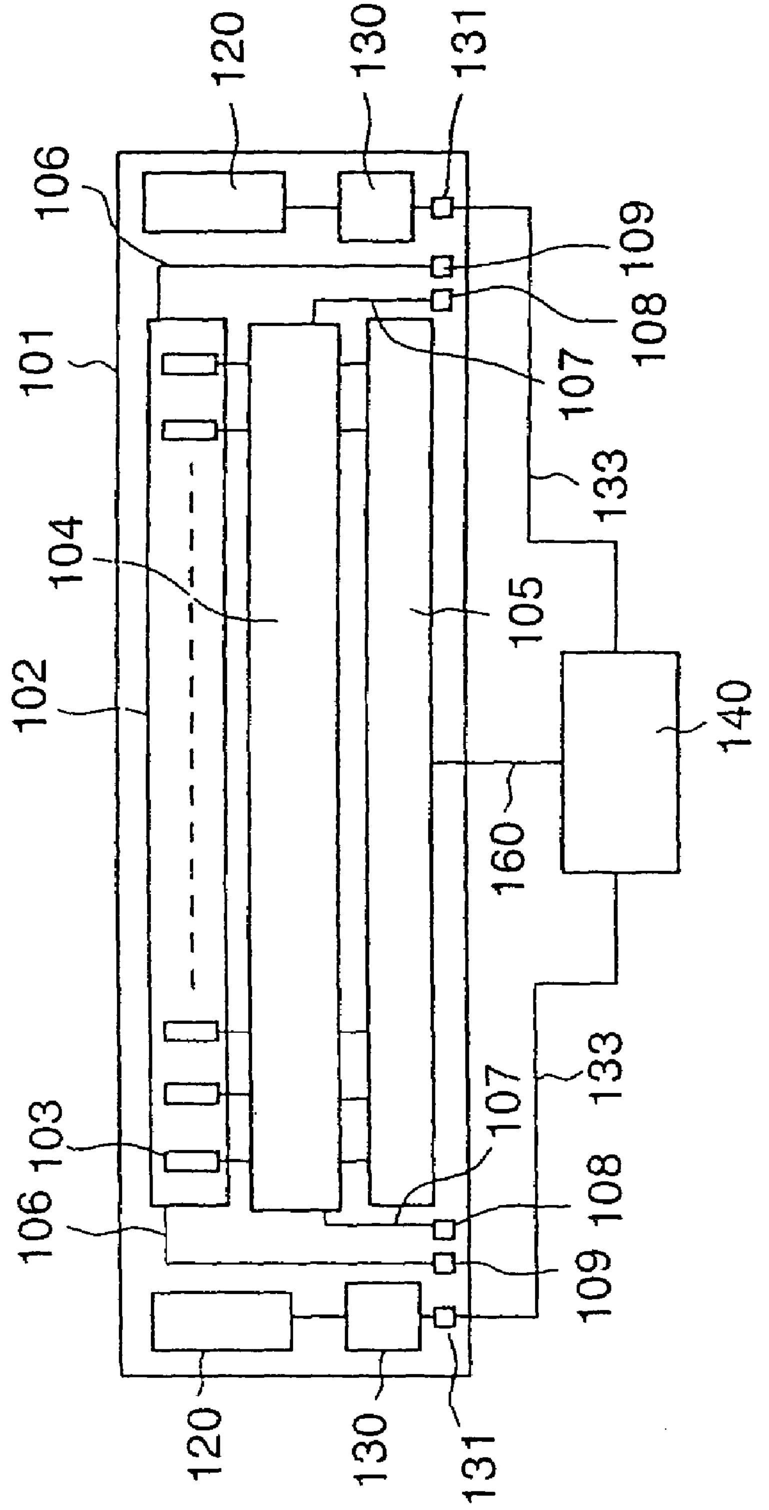
FIG. 4 is a block diagram showing the construction of a printing head substrate.

FIG. 4 is a block diagram showing the construction of a substrate to perform drive control of the printing head IJH according to a first embodiment of the present invention.

Figure 8:
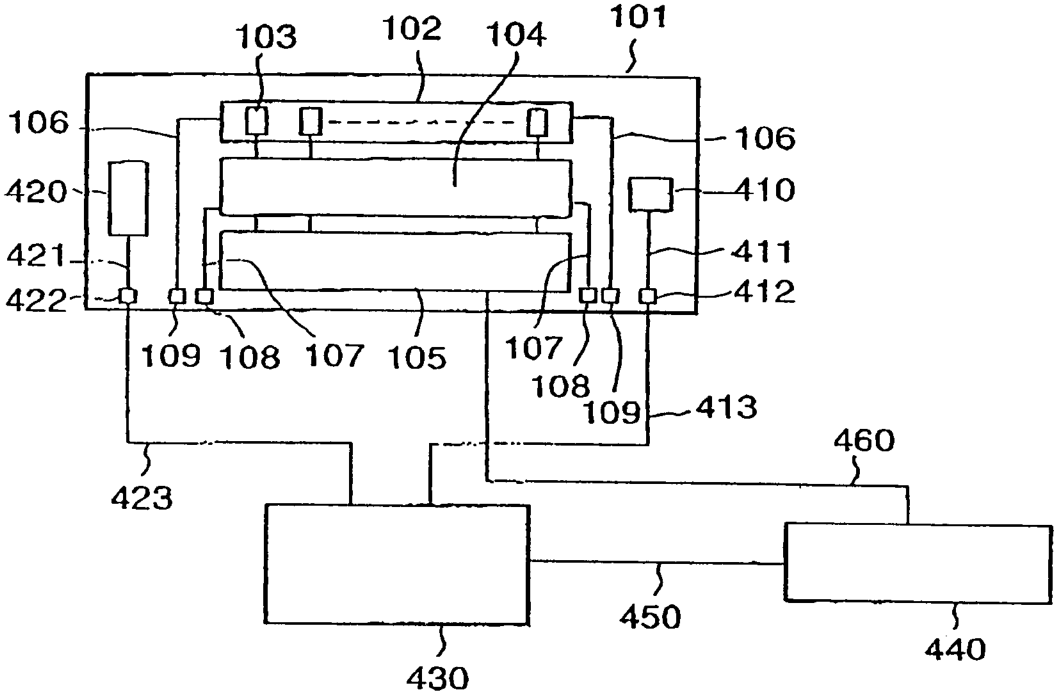
FIG. 8 Prior Art
FIG. 8 is a block diagram showing the printing head substrate according to a conventional art.

Note that in FIG. 4, elements corresponding to those in the conventional art as shown in FIG. 8 have the same reference numerals and explanations of the elements will be omitted.

In FIG. 4, numeral 120 denotes device blocks formed on the substrate on which the printing head is provided, having devices for detecting the condition of the substrate (base plate) 101; 130, A/D converter blocks for digitizing output signals from the devices in the device blocks 120; 131, terminals for leading the outputs from the A/D converter blocks 130 to the outside of the printing head IJH; 140, a judgment-circuit block for inputting the outputs from the A/D converter blocks 130 to detect the condition of the substrate 101, and feeding back appropriate control in correspondence with the detected condition to the substrate 101; 133, external wirings connecting the terminals 131 to the judgment circuit block 140; and 160, wiring connecting the judgment circuit block 140 to the logic circuit 105.

Note that the relation between FIG. 4 with FIG. 2 is as follows. The judgment circuit block 140 is constructed to realize a part of functions executed by the MPU 1701 and the head driver 1705 of the control circuit in FIG. 2.

Figure 5:
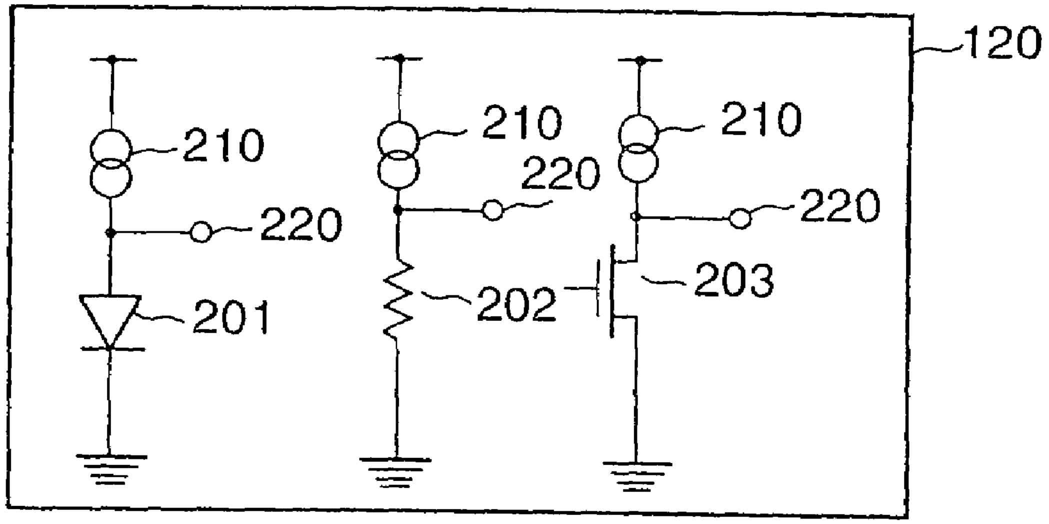
FIG. 5 is a circuit diagram of a device block.

FIG. 5 is a circuit diagram showing the respective devices of the device block 120 formed on the substrate.

As shown in FIG. 5, the device block 120 comprises a p-n junction diode 201 with a known temperature characteristic as a temperature detection device, a monitoring resistor 202 of the same material of the heaters and formed by the same process as that of the heater 103, for monitoring a resistance value of the heater 103, and a monitoring transistor 203 of the same conduction type of that the power transistor and formed by the same process as that of the power transistor, for monitoring ON resistance of the power transistor. A constant-current power supply 210 supplies a constant current to these devices, and output terminals,220 of the respective devices output voltages reflecting a substrate temperature, a heater resistance value, ON resistance of the power transistor, as analog values.

In FIG. 5, the device block 120 comprises the temperature detection device, the monitoring resistor and the monitoring transistor as constituents, however, only one of these devices, or any combination of these devices may be employed.

When the devices as the constituents of the device block 120, i.e., the p-n diode 201, the resistor 202, the transistor 203 respectively receive the constant current from the constant-current power supply 210, the following outputs are obtained from the output terminals 220.

If the p-n junction diode 201 is employed as the device, its terminal 220 outputs a forward voltage corresponding to the substrate temperature at that time. If the resistor 202 is employed as the device, its terminal 220 outputs a value for potential drop consistent with the resistance value corresponding to the resistance value of the heater 103. If the transistor 203 employed as the device, its terminal 220 outputs a value for potential drop consistent with the ON resistance value of the power transistor. Note that these output voltages have analog values.

Figure 6:
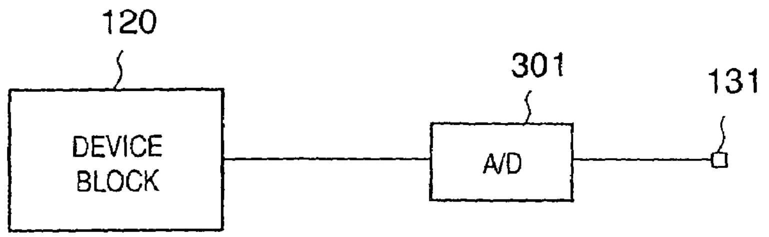
FIG. 6 is a block diagram showing the relation between an A/D converter and the device block.

FIG. 6 is a block diagram-showing the relation between the A/D converter block 130 which converts analog signals from the device block 120 into digital values and the device block 120.

In FIG. 6, numeral 301 denotes an A/D converter.

The output signals obtained from the terminals 220 in FIG. 5 are converted by the A/D converter 301 into digital values. Even if the constant-current power supply 210 in the device block 120 in FIG. 5 is an external current power supply, i.e., a constant-current power supply to supply a current from the outside of the printing head IJH, the external constant-current power supply obtains a similar result to that obtained by the constant-current power supply in the device block 120. Further, even if the devices to obtain respective device characteristics are replaced with other devices such as a constant-voltage power supply and a fixed pattern generator, the latter devices obtain similar results to those obtained by the former devices.

Further, the method and precision of the A/D converter 301 may be arbitrarily selected within a necessary range.

For example, an example of A/D conversion of the forward voltage of the p-n junction diode to detect a temperature rise of the substrate will be described below.

Since it is necessary to form the A/D converter on the substrate on which a driver for ink discharge is formed, to minimize the increase in cost, the converter with a small scale as much as possible is desirable.

Further, regarding the precision of the A/D/converter, to discharge ink at a constant discharge characteristic, an A/D converter having a minimum resolution corresponding to a temperature range of about 5° C. may be sufficiently used. Further, such converter may output values for temperatures at unstable temperature intervals, and may output discontinuous and discrete values for a necessary temperature. An A/D converter as small as possible is preferably employed as long as it satisfies the above characteristics. Further, if the amount of electric consumption of the A/D converter is large, the substrate temperature rises due to the influence of the electric consumption and may affect the temperature rise of the entire substrate. Accordingly, it is preferable to employ an A/D converter with electric consumption as small as possible.

Figure 9:
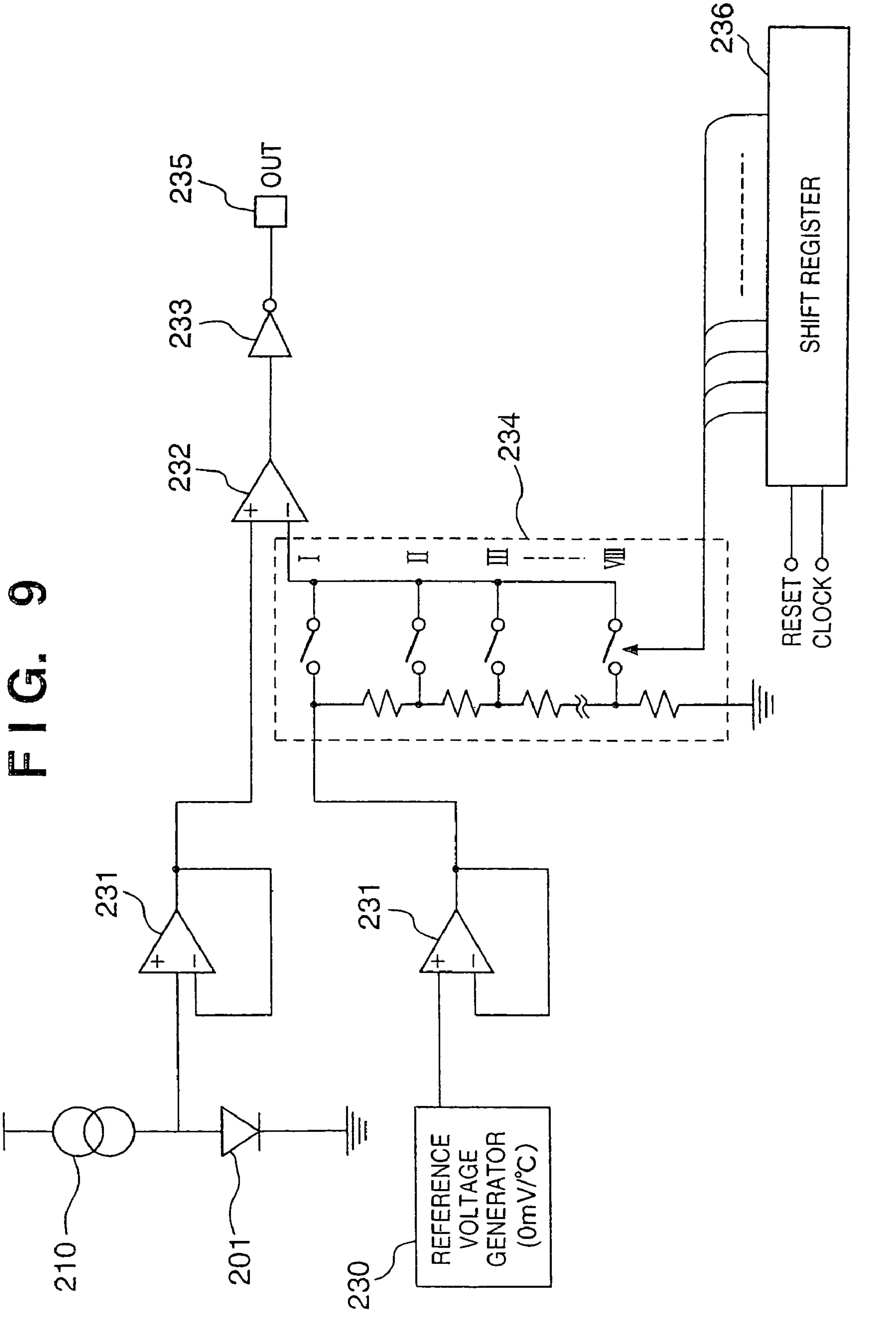
FIG. 9 is a block diagram showing the construction of the A/D converter.

From these points of view, an A/D converter having a construction as shown in FIG. 9, for example, is preferable as the A/D converter of the present invention.

In FIG. 9, numeral 210 denotes the constant-current power supply; 201, the p-n junction diode having a liner output voltage characteristic with respect to temperature; 230, a reference voltage generator having an approximately invariant output voltage characteristic with respect to temperature; 231, buffers; 232, a comparator; 234, a group of voltage dividing resistors and analog switches for obtaining a voltage corresponding to a desired detected temperature by dividing a voltage outputted from the reference voltage generator 230; 233, an output buffer; 236, a shift register, and 235, an output terminal.

Figure 10:
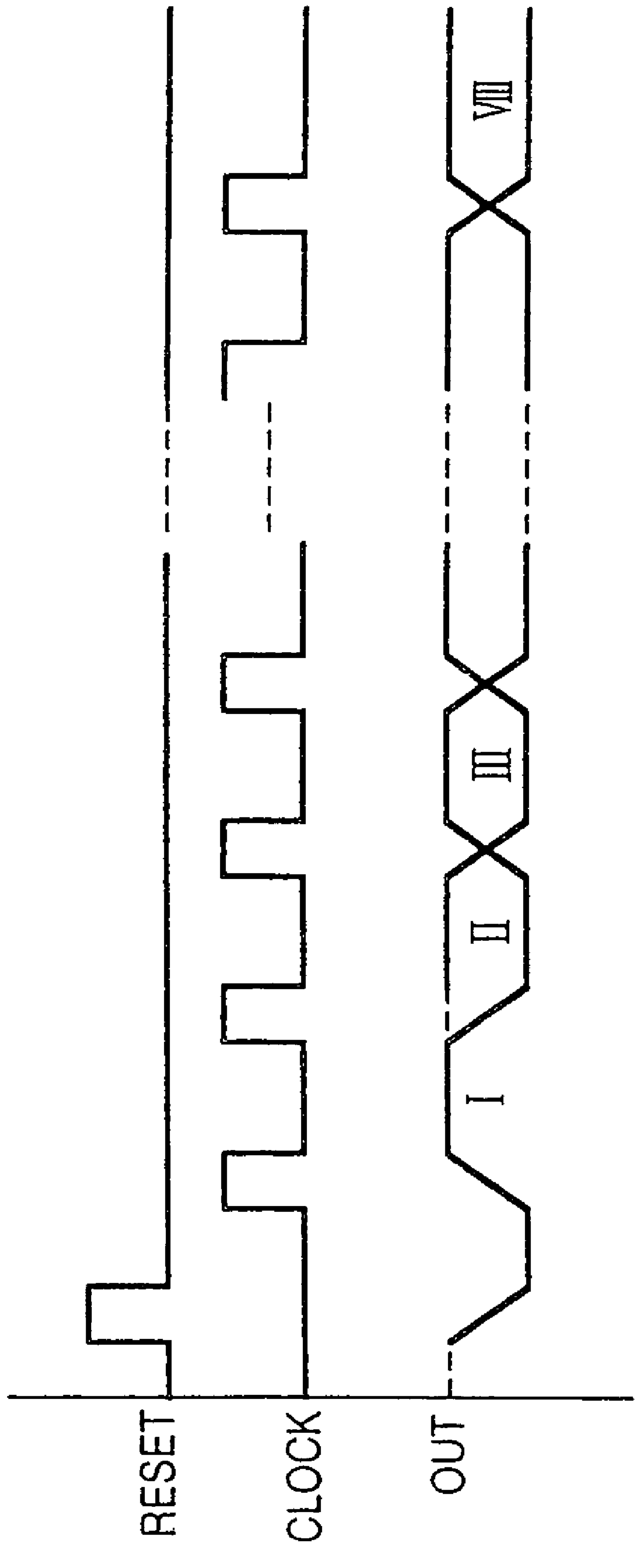
FIG. 10 is a timing chart explaining operations of the circuits in FIG. 9.

FIG. 10 is a timing chart explaining operations of the circuits in FIG. 9.

The output from the p-n junction diode 201 which is energized by the constant-current power supply 210, have a linear output voltage characteristic with respect to temperature. Further, the output voltage characteristic of the reference voltage generator is approximately invariant with respect to temperature. The analog signal voltage from the diode is converted into a digital value by comparing these outputs by the comparator. At this time, the reference voltage side is set to a voltage corresponding to a desired detected temperature by the voltage division by the voltage dividing resistor, and the switches connected to voltage dividing points I to VIII of the voltage dividing resistors are sequentially switched by the shift register which operates in synchronization with a clock pulse. For example, if a voltage to cause the diode to output a voltage having a temperature characteristic of −2 mV/° C. is generated, and voltages of the voltage dividing points of the voltage dividing resistors are provided at 8 points by 10 mV, 8-point temperatures at 5° C. intervals can be detected from the output from the output terminal 235 which varies in synchronization with the clock pulse. This obtains similar result to that obtained by digital conversion at 5° C. resolution with respect to a temperature in a range of 40° C.

As shown in FIG. 10, the shift register has a clock input terminal and a reset signal input terminal. After reset at predetermined timing, the output from the output terminal 235 is monitored in synchronization of rise of the clock pulse. The output from the output terminal changes from a High level to a Low level at timing corresponding to a predetermined temperature. Thus, digitized temperature detection can be made.

In this construction, if the resolution is comparatively rough for, e.g., 5° C. increments, the A/D converter can be formed on the substrate of the ink-jet printing head with a small-scale construction having the reference voltage generator, the comparator and the resistors of the number of detection temperature points. Further, the number of the reference voltage generators and that of the comparators are one, the electric consumption of the entire circuit is suppressed, and a bad influence on temperature rise of the substrate can be avoided.

Further, if the resistor for monitoring heater resistance value or the transistor for monitoring the ON resistance of the power transistor, in place of the p-n junction diode, is connected to the constant-current power supply, the output value can be A/D converted at a desired resolution.

Next, the operation of the printing head IJH having the above construction will be described.

The rise of substrate temperature due to heat generated by printing operation of the printing head IJH affects control to constant ink discharge as described above in the conventional art. Further, the variation in resistance values of the respective heaters of the printing head causes variation in the amount of heat generated by the heaters, which affects ink discharge control when the printing head has been exchanged for new one.

Further, as the power transistor to drive the heaters consumes the driving current by its resistance component, it is preferable to employ a power transistor with a resistance component as small as possible. However, now matter how small the resistance component is, electric power loss cannot be avoided, and further, the electric power loss differs:in individual printing heads similarly to heater resistance values. Accordingly, the electric power loss different in individual printing heads appears as variation in heat generating amounts by the heaters, and as a result, causes variation in ink discharge characteristics. Therefore, it is necessary to monitor the resistance component of the power transistor in each printing head and always perform optimum control.

In this manner, the substrate temperature, the heater resistance value and the power transistor ON resistance value are given as typical elements to represent the condition of the substrate of the printing head IJH.

The devices to respectively monitor these elements are held in the device block 120. These devices output the respective values as analog values. The analog values are sent to the A/D converter 301 and converted into digital values.

The digital values are sent via the terminal 131 and the wiring 133 to the judgment circuit block 140. The judgment circuit block 140 receives digital-value outputs, then detects respective condition (the substrate temperature, the heater resistance value and the power transistor ON resistance value), selects an optimum driving pulse in accordance with the detected condition and feeds back the pulse to the logic circuit 105.

Note that to maintain constant ink discharge condition, optimum driving must be performed in accordance with the condition of the substrate. Such driving can be made by changing a period to pass a current through the heater, i.e., the pulsewidth of a pulse (hereinbelow referred to as "heat pulse") to drive the driver transistor. Accordingly, when the condition of the substrate as digital values has been received, the heat pulse width is determined in accordance with the values, and the printing head is driven with the determined heat pulse width.

FIGS. 11A and 11B are tables for determining a heat pulse width when the temperature, the heater resistance value and the transistor ON resistance value change within a predetermined range.

For example, if the resolution of the temperature detection is set with 8 ranks as shown in FIG. 11A, a table for 8 ranks is prepared such that the fourth condition is a standard heat pulse width (Th), and the pulsewidth is reduced by 2% with temperature rise by 1 rank, while the pulse width is increased by 2% with temperature drop by 1 rank. The table is stored in a memory of the driving device, and when a digital values have been received, the driver transistor is driven with a heat pulse width Th obtained from the table.

Further, the heater and the transistor are serially connected in the substrate, these resistance values are obtained as a sum of both resistance values. Therefore, the pulsewidth may be determined based on the sum of these resistance values. As shown in FIG. 11B, a matrix format table can be used for efficiently selecting a predetermined heat pulse width Th.

In a matrix of a rank corresponding to the resistance value received as a digital value, if the resistance increases in rank, the pulsewidth Th is increased, while if the resistance value decreases in rank, the pulsewidth Th is reduced. Thus an optimum driving pulse is determined. In the present embodiment, if the resistance value increases or decreases by 1 rank, Th is increased or decreased by 1%, the amount of increment or decrement may be determined appropriately.

According to the present embodiment as described above, as the A/D converter is provided on the substrate of the printing head, and the information reflecting the substrate temperature, the heater resistance value, the power-transistor ON resistance value are outputted to the printing apparatus as digital signals, the information can be received with high precision without influences by various noise generated from the printing head.

By this construction, printing head drive control can be more precisely performed based on the information more precisely reflecting the substrate temperature, the heater resistance value, the power transistor ON resistance value. Thus, the printing head can be controlled so as to obtain more stable ink discharge characteristic.

In the above-described first embodiment, analog information indicative of the substrate temperature, the heater resistance value and the power transistor ON resistance value are read from the respective terminals of the device block 120 at fixed intervals, and the analog information are converted into digital values, so that optimum control is fed back to the printing head. Regarding an element which always varies depending on the change of printing head driving condition, such as the substrate temperature, the above control is necessary, however, as the heater resistance value and the power transistor ON resistance value, different in individual printing heads, do not vary with time, it may be arranged such that these values are read only once and stored into a nonvolatile memory when the printing head is exchanged for new one, and the values in the memory are read thereafter.

Figure 7:
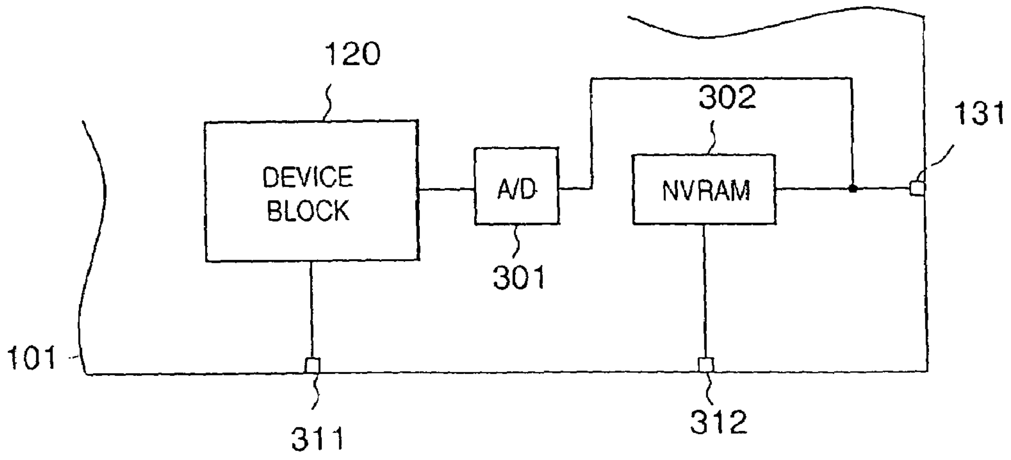
FIG. 7 is a block diagram showing the relation between the A/D converter and the device block according to a modification.

FIG. 7 is a block diagram showing a characteristic part of the printing head IJH according to this modification.

In FIG. 7, numeral 311 denotes an external terminal for measuring characteristics of the respective devices of the device block 120; 302, a nonvolatile memory (NVRAM) for storing values measured from the respective devices; and 312, a terminal for writing data into the NVRAM 302.

In the construction in FIG. 7, the heater resistance and the transistor ON resistance in the device block 120 are measured via the external terminal 311 by factory-shipment inspection of the printing head IJH, and digital values corresponding to the resistance values are written into the NVRAM 302 via the terminal 312. The stored values are read from the terminal 131 in accordance with necessity. Thus, the digital values can be easily obtained without measurement of the devices in the device block 120.

The particular device as the NVRAM 302 may be arbitrarily selected in accordance with necessary precision, used semiconductor process and the like. For example, an EPROM, an EEPROM, a fuse ROM or the like may be employed.

According to the above-described modification, the information indicative of characteristics which do not vary with time such as the heater resistance value and the power transistor ON resistance value can be written as digital information into a nonvolatile memory of the printing head by factory-shipment inspection or the like, then can be read from the memory and used in accordance with necessity in printing head drive control. Further, only information on the substrate temperature which varies with time can be periodically read as digital information via the device block 120 and the A/D converter 301.

Note that the above-described first embodiment and its modification, devices representing the characteristics such as the substrate temperature, the heater resistance value and the power transistor ON resistance value are used as the devices contained in the device block 120 representing the condition of the substrate, however, the present invention is not limited to these devices. For example, a device for monitoring the residue of ink to be discharged, a device for monitoring switching speed values of individual transistors, further, devices for monitoring other characteristics such as a PH value representing acid/alkaline hydrogen-ion concentration of ink and external humidity may be employed.

Further, as constituents of the substrate, devices for monitoring individual substrate values such as the film thickness of a wiring layer and the film thickness of a protective layer may be employed.

Note that as the switching speeds of the transistor, wiring layer film thickness, the protective film thickness and the like do not vary with time, values obtained by factory-shipment measurement may be written into a nonvolatile memory as digital values, as described above.

Second Embodiment

Next, a second embodiment of the printing head of the present invention will be described.

Figures 12A, 12B, 12C:
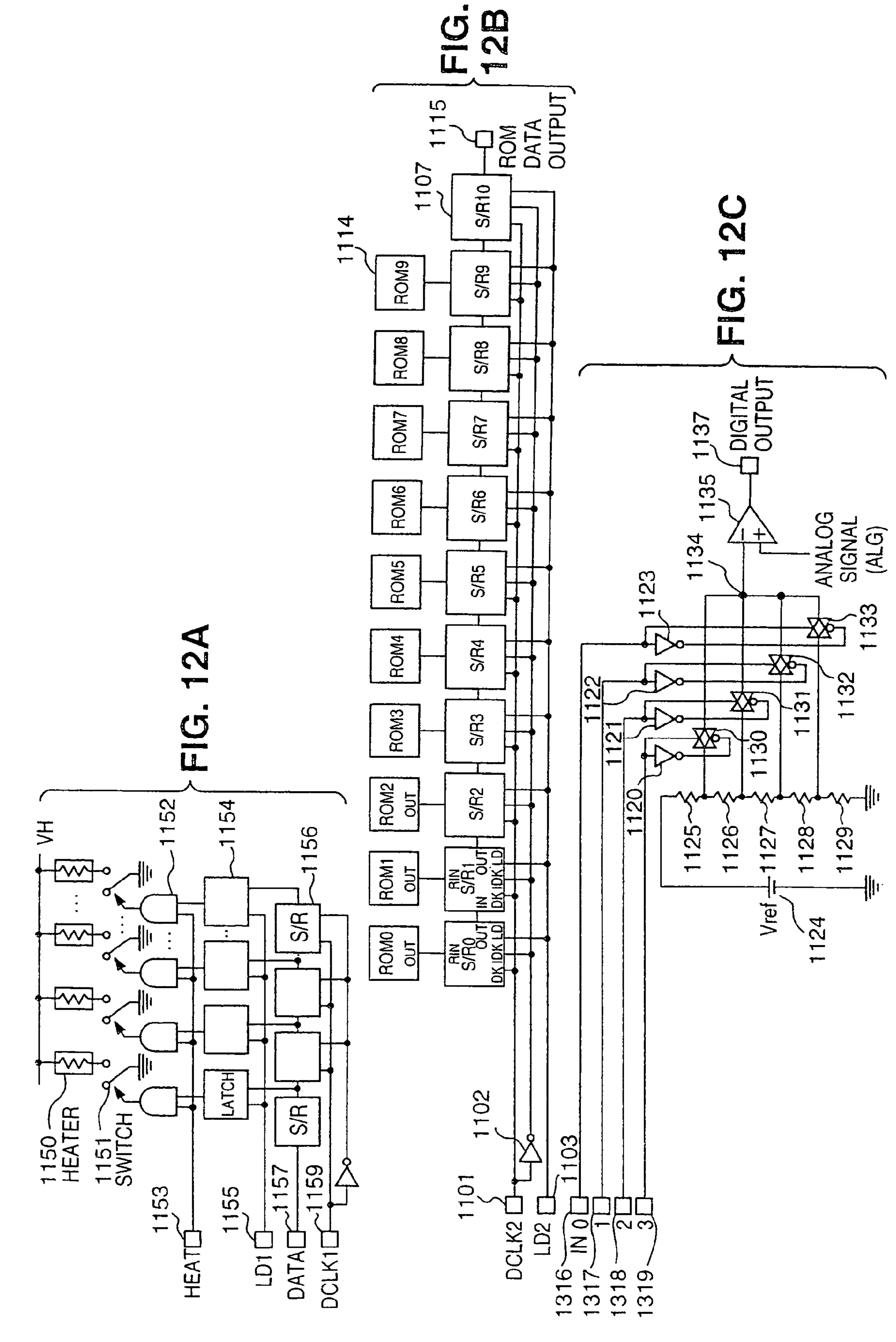
FIGS. 12A to 12C are circuit diagrams showing the constructions of circuits of the printing head formed on one substrate.

FIGS. 12A to 12C are circuit diagrams showing the arrangement of built-in circuits of the printing head formed on one substrate.

FIG. 12A shows the construction of a heater driver which drives the heaters in accordance with an input image signal. FIG. 12B shows the construction of a circuit (ROM data output circuit) which serially outputs data (hereinafter referred to as "ROM data") indicative of variation in resistance of respective switches comprising power transistors corresponding to the respective heaters. FIG. 12C shows the construction of the A/D converter which inputs the condition of the printing head (printing head temperature and the like) as analog values and outputs the values as digital values.

Figures 13A, 13B, 13C:
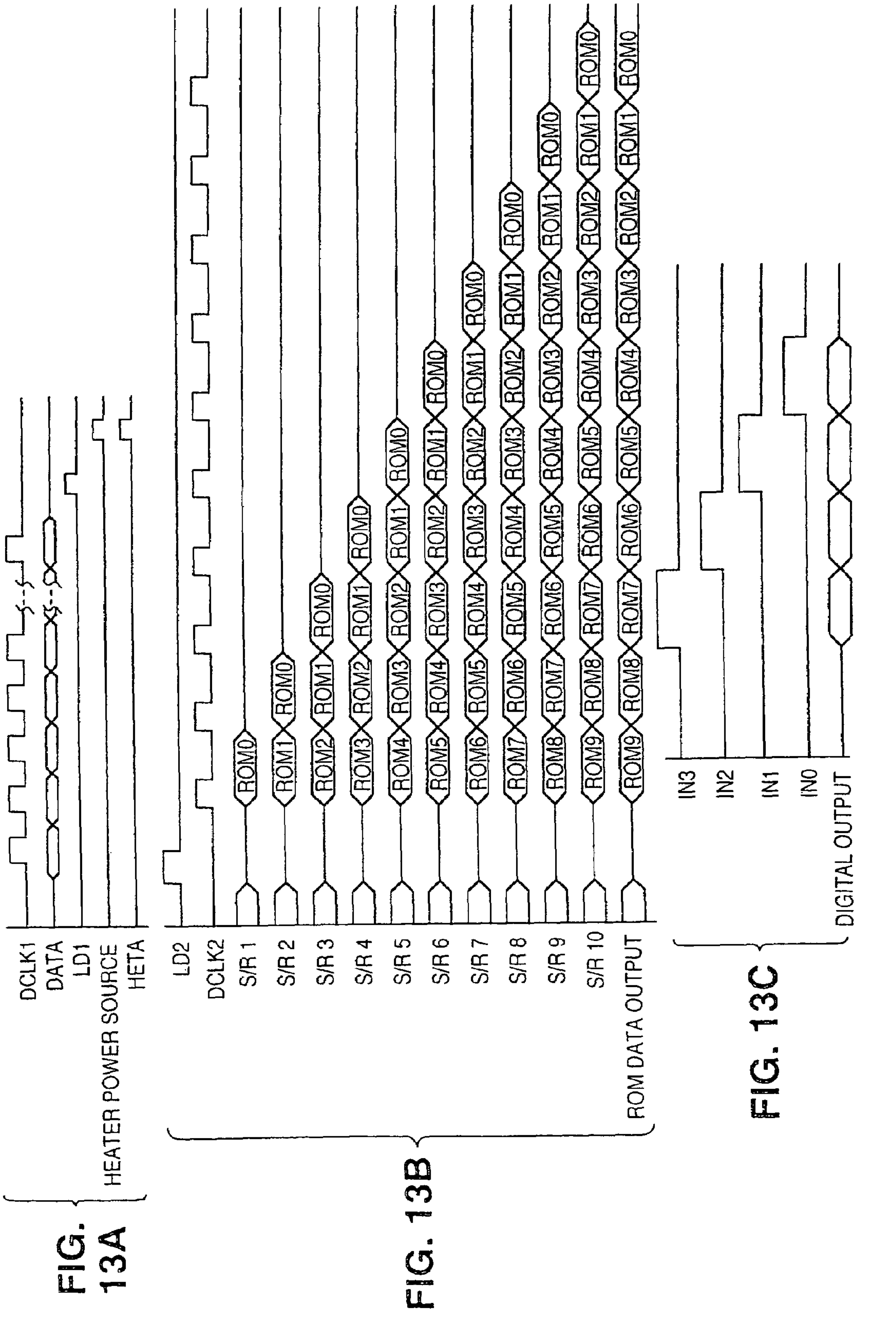
FIGS. 13A to 13C are timing charts showing timing of various signals inputted/outputted with respect to the printing head shown in FIGS. 12A to 12C.

FIGS. 13A to 13C are timing charts showing timing of various signals inputted/outputted with respect to the printing head as shown in FIGS. 12A to 12C. FIG. 13A shows timing of output signals to the circuit in FIG. 12A. FIG. 13B shows timing of input/output signals with respect to the circuit in FIG. 12B. FIG. 13C shows timing of input/output signals with respect to the circuit in FIG. 12C.

Next, the construction and the operation of the printing head will be described.

First, ink discharge operation will be described with reference to FIG. 12A and FIG. 13A.

As shown in FIG. 12A, a plurality of shift registers (S/R) 1156 are provided in correspondence with respective heaters 1150, and serially connected. The outputs from the respective shift registers (S/R) 1156 are connected to latch circuits (LATCH) 1154. The outputs from the latch circuits 1154 are connected to input terminals of AND gates 1152. On the other hand, the other input terminals of the AND gates 1152 are connected to an input pad (PAD) 1153 for inputting a heat signal (HEAT).

The outputs from the AND gates 1152 control opening/closing of switches 1151 to control energization of the heaters 1150. When the switches 1151 are turned ON in accordance with the output signals from the AND gates 1152, the heaters 1150 are energized, then ink is heated by thermal energy from the heaters 1150, and the ink is discharged from discharge nozzles.

As shown in FIG. 13A, an image signal (DATA) is serially inputted from a data input pad (PAD) 1157 in synchronization with a clock signal (DCLK1) inputted from an input pad (PAD) 1159. When image signal has been inputted into the plurality of shift registers (S/R) 1156, a latch signal (LD1) pulse is inputted from an input pad (PAD) 1155, and the image signal (DATA) temporarily stored in the plurality of shift registers (S/R) 1156 are read at once and held by the latch circuits 1154.

Then, in accordance with logical products between the levels (H/L) of the latched image signals and the level (H/L) of the heat signal (HEAT) inputted from the input pad (PAD) 1153, the AND gates 1152 become enable condition. Then the switches 1151 are electrically connected to the heaters 1150, thus an electric current flows from VH power source lines shown in FIG. 12A to the heaters 1150. Only a heater where the image signal level is "H" (high level) is energized. The energization causes the heater to generate heat, and ink is discharged by the thermal energy. Note that the heater is turned ON only for a period where the pulse of the heat signal (HEAT) is applied.

Next, the construction and operation of the ROM data output circuit will be described with reference to FIG. 12B and FIG. 13B.

As the substrate of the printing head is manufactured through the semiconductor manufacturing process, there is variation in IC chip characteristics. This variation may influence the ink discharge characteristic. Accordingly, it is necessary to minimize the influence on the ink discharge characteristic due to the above variation, and to improve the durability of the heaters by applying optimum power in consideration of the variation to the heaters.

Accordingly, as shown in FIG. 12B, the substrate of the printing head has ten ROMs 1114 for storing information on variation in resistance of the heaters 1150 caused by semiconductor manufacturing process, variation in IC chips such as variation in ON resistance of the switches 1151 to turn the heaters ON/OFF.

As shown in FIG. 13B, a latch signal (LD2) is inputted into the ROM data output circuit from an input pad (PAD) 1103, then a clock signal (DCLK2) is inputted into the ROM data output circuit from an input pad (PAD) 1101, and the ROM data is serially (ROM0, ROM1, ROM2, ROM3, . . . ) outputted from an output pad (PAD) 1115 in synchronization with the clock signal.

As shown in FIG. 12B, the ROM data output circuit has ten shift registers (S/R0, S/R1 . . . , S/R9) 1107, one-to-one corresponding to the ten ROM 1114. The shift registers are serially connected, and connected to the PAD 1115 finally via another shift register (S/R10). In this connection, adjacent shift registers (S/R0 to S/R10) are connected via the input terminal (IN) and the output terminal (OUT).

Figure 14:
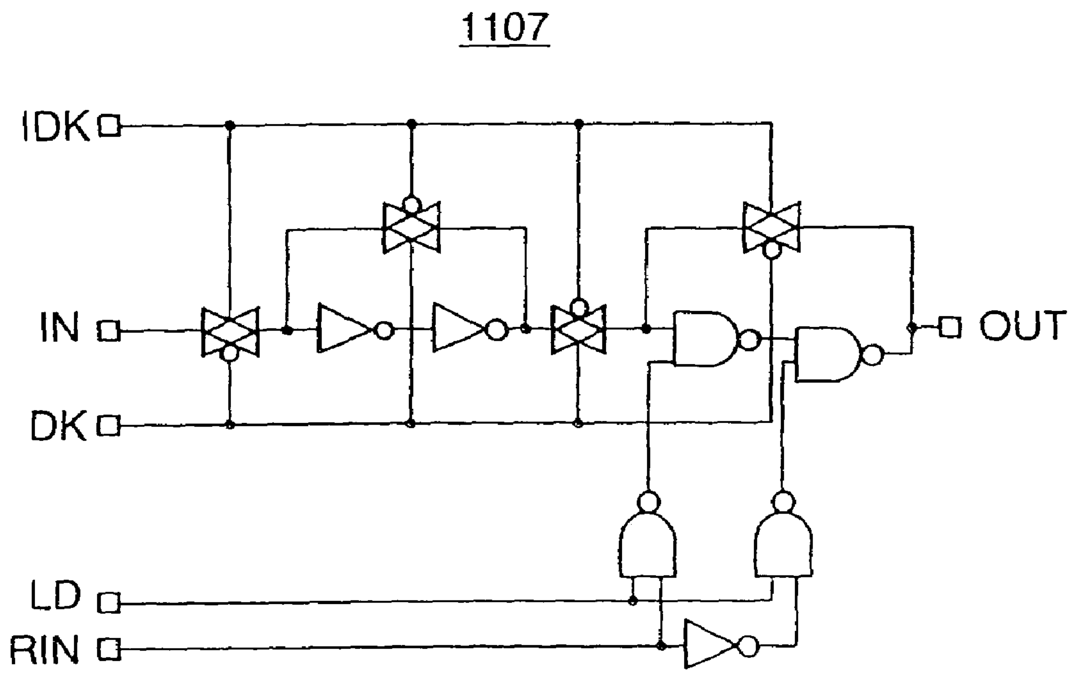
FIG. 14 is a circuit diagram showing the construction of one shift register.

FIG. 14 is a schematic diagram showing the construction of one shift register.

As the PAD 1101, the clock signal inverted by an inverter 1102 and the PAD 1103 are commonly connected to these shift registers and the other shift register (S/R10), data from the ten ROMs 1114 are read in parallel by one pulse of the latch signal (LD2) inputted from the PAD 1103, and stored in the respective shift registers 1107.

Referring to FIG. 12B and FIG. 14, the clock signal (DCLK2) inputted from the PAD 1101 is inputted into DK terminals of the respective shift registers, and the inverted clock signal is inputted into IDK terminals of the respective shift registers, and the latch signal inputted from the PAD 1103 is inputted into LD terminals of the respective shift registers. Further, the output signals from the ROMs 1104 are inputted into RIN terminals of the respective shift registers.

Next, the clock signal (DCLK2) is inputted from the PAD 1101, and in synchronization with the rising edge of the clock signal, the ROM data is outputted from the PAD 1115.

Figure 15:
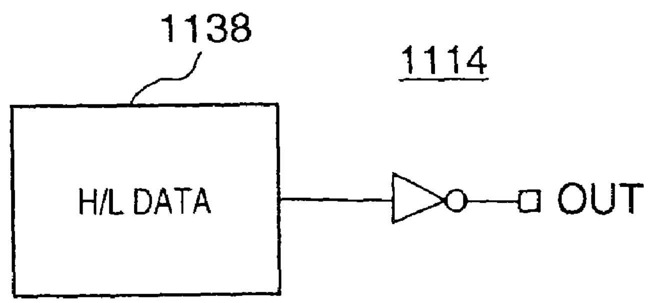
FIG. 15 is a block diagram showing the construction of one ROM 1114.

FIG. 15 is a block diagram showing the construction of one ROM 1114.

In each ROM, electrical writing is performed with respect to a memory device 1138 from the outside of the device upon completion of semiconductor manufacturing process. More specifically, a signal level (H/L) to be stored is determined by burning heat-melt-breakable material, or storing a signal level (H/L) into a capacitor using a ferroelectric substance.

Next, the operation of the shift register in a case where the signal level stored in the memory device 1138 as shown in FIG. 15 is high "H" and that in a case where the signal level is low "L" will be described.

(1) In High Level "H" Case

In this case, the signal at the output terminal (OUT) of the ROM is at the low level "L", a low level "L" signal is inputted from the RIN terminal of the shift register (S/R) connected to the output terminal (OUT). However, at this time, the signal is not stored in the shift register (S/R).

Next, if one pulse of the latch signal (LD2) is inputted when the clock signal (DCLK2) is at the low level "L", the signal inputted at the RIN terminal enters the shift register (S/R). Then, as apparent from the logical structure of the shift register as shown in FIG. 14, if the signal level at the RIN terminal is "L" and the level of the latch signal (LD2) is "H", the signal level at the output terminal (OUT) of the shift register (S/R) is maintained at "H". As described above, the 10 shift registers (S/R0 . . . , S/R9) are connected parallel to the ten ROMs 1114, all the ROM data are transferred to the shift registers (S/R) and held there at the same timing.

(2) In Low Level "L" Case

In this case, as the signal at the output terminal (OUT) of the ROM is at the high level "H", a high level "H" signal is inputted from the RIN terminal of the shift register (S/R) connected to the output terminal (OUT). However, at this time, the signal is not held in the shift register (S/R).

Next, if one pulse of the latch signal (LD2) is inputted when the clock signal (DCLK2) is at the low level "L", the signal inputted at the RIN terminal enters the shift register (S/R). Then, if the signal level at the RIN terminal is "H" and the level of the latch signal (LD2) is "H", the signal level at the output terminal (OUT) of the shift register (S/R) is maintained at "L".

Note that even if signals with mixed levels of "H" and "L" are stored in the respective memory devices of the ten ROMs 1114, signal levels are held in the shift registers (S/R0, . . . , S/R9) in correspondence with the signal levels.

In this manner, when the ROM data are transferred to the shift registers (S/R) and held there, the ROM data are outputted from the shift registers (S/R) in synchronization with the rising edge of the pulse of the clock signal(DCLK2) (i.e., parallel data read from the ROMs are converted to serial data and outputted).

Finally, the construction and operation of the A/D converter will be described with reference to FIG. 12C and 13C.

As the present printing head discharges ink by applying thermal energy generated by heat generation by the heaters to ink, the temperature of the printing head itself rises by the heat generation by the heaters. On the other hand, the viscosity of ink depends on temperature. Further, the ink discharge amount depends on the ink viscosity. Accordingly, the printing head temperature, i.e., ink temperature influences the ink discharge amount.

Accordingly, it is necessary to feed back the printing head temperature to a CPU of the printing apparatus main body side, so as to perform print control in consideration of ink discharge characteristic based on temperature change. Further, it is necessary to perform print control such that the printing head temperature does not exceed an allowable temperature by heat generation by the heaters. However, as the output from a temperature sensor to measure the temperature is an analog value, an A/D converter is required to convert the analog value to a digital value for processing by the CPU.

As described above, such circuit can be provided on the main body of the printing apparatus, however, as described in the first embodiment, in order to simplify the construction of the main body and to reduce the influence of the noise, it is preferable to perform A/D conversion in the printing head. Accordingly, the substrate of the printing head of the present embodiment has the A/D converter.

The A/D converter inputs an analog signal (ALG) such as a temperature sensor output (a voltage in proportion to the temperature) in the printing head, compares the input signal with a reference voltage, and outputs the result of comparison as a digital value. The reference voltage is one of 4-ranked signals (IN0 to IN3) inputted via four input pads (PAD) 1316 to 1319.

In FIG. 12C, numeral 1124 denotes a constant-voltage power supply (Vref) which is not influenced by temperature change and variation of external power; 1125 to 1129, serially connected resistors. Each resistor obtains an arbitrary voltage by each resistance ratio. Further, numerals 1130 to 1133 denote analog switches for ON/OFF operations in accordance with the input signal (IN0 to IN3).

When one of the input signals (IN0 to IN3) is inputted from one of the four input pads 1316 to 1319, the signal is inverted by the inverter (1120 to 1123), then inputted into selected one of the analog switches 1130 to 1133, and the voltage of a node connected to the selected analog switch is inputted via a node 1134 into a negative (−) terminal of a comparator 1135.

The comparator 1135 compares the input analog signal (ALG) with the input voltage as the reference voltage. The result of comparison is outputted as a digital signal from a digital output terminal 1137.

Next, another embodiment of the printing head to reduce the number of pads and wirings in the above embodiment will be described.

Figures 16A, 16B, 16C:
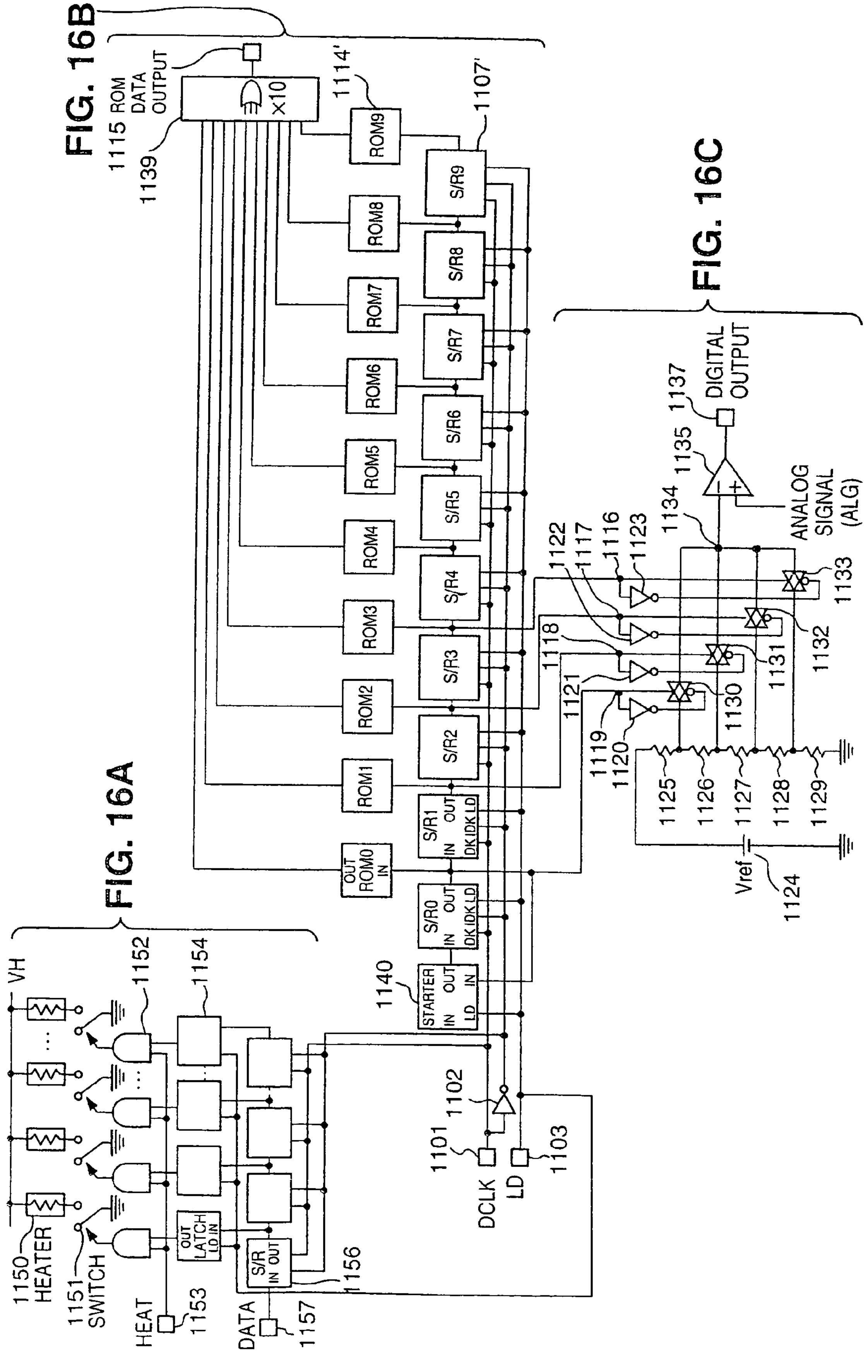
FIGS. 16A to 16C are circuit diagrams showing the constructions of circuits of the printing head IJH according to one embodiment of the present invention.

FIGS. 16A to 16C show the construction of the substrate installed in the printing head IJH according to this embodiment.

Note that in FIGS. 16A to 16C, elements and signals corresponding to those in the construction of the substrate of the printing head in FIGS. 12A to 12C have the same reference numerals, therefore, explanations of the elements and signals will be omitted, but elements characterizing the present embodiment and their operations, especially the difference between the above embodiment shown in FIGS. 12A to 12C will be described. FIG. 16A shows a heater driver corresponding to the heater driver in FIG. 12A which drives heaters. FIG. 16B shows the ROM data output circuit corresponding to the ROM data output circuit in FIG. 12B. FIG. 16C shows the A/D converter corresponding to the A/D converter in FIG. 12C. Accordingly, data similar to that stored in the ROMs 1114 in FIG. 12B are stored into the ROMs 1114' in FIG. 16B.

Different from the embodiment in FIGS. 12A to 12C, a latch signal (LD) inputted from the PAD 1103 is inputted into the latch circuits (LATCH) 1154 of the heater driver, and also inputted as a latch signal to the shift registers (S/R0 to S/R9) 1107'. Further, a clock signal (DCLK) inputted from the PAD 1101 and its inverted signal are inputted into the shift registers (S/R) 1156 of the heater driver and also inputted into the shift registers (S/R0 to S/R9) 1107'.

Figure 17:
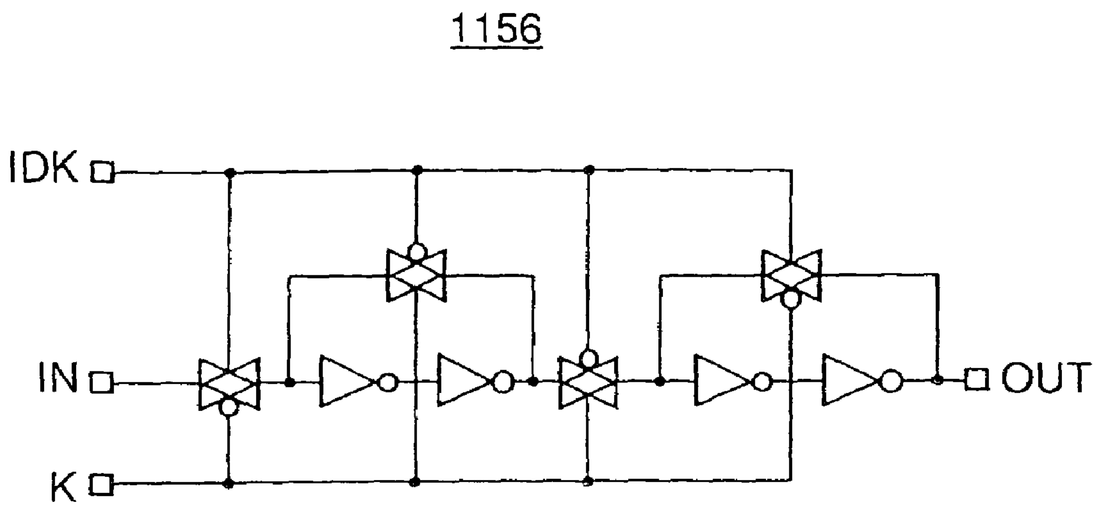
FIG. 17 is a circuit diagram showing the construction of a shift register (S/R) 1156.

FIG. 17 is a circuit diagram showing the construction of the shift register (S/R) 1156. In FIG. 17, a terminal DK is a clock signal (DCLK) input terminal; a terminal IDK is an inverted clock input terminal; a terminal IN is an image signal (DATA) input terminal; and a terminal OUT is an image signal (DATA) output terminal.

Figure 18:
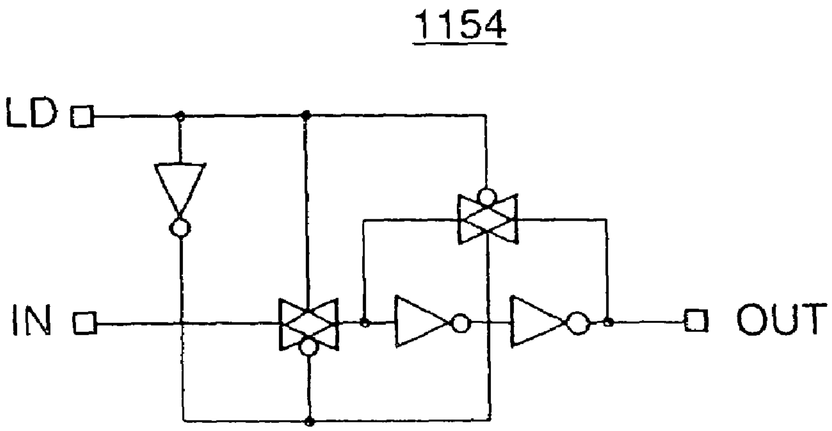
FIG. 18 is a circuit diagram showing the construction of a latch circuit (LATCH) 1154.

FIG. 18 is a circuit diagram showing the construction of a latch circuit (LATCH) 1154. In FIG. 18, a terminal LD is a latch signal (LD) input terminal; a terminal IN is an input terminal for inputting an image signal (DATA) from the shift register (S/R) 1156; and a terminal OUT is a latched image signal output terminal.

Regarding the ROM data output circuit, the output from the output terminal (OUT) of each of the ten shift registers (S/R0 to S/R9) 1107' is connected to the input terminal (IN) of the subsequent shift register, and connected to address input terminals (IN) of the ten ROMs 1114'. Thus, the ten shift registers and the ten ROMs are one-to-one connected. In FIG. 16B, 10-bit shift registers are shown. Further, a starter 1140 is connected to the shift registers 1107'. The starter 1140 has an LD terminal which inputs the latch signal inputted from the PAD 1103, an IN terminal which inputs a signal from the output terminal (OUT) of the shift register (S/R0), and an output terminal (OUT) which outputs an output signal to the input terminal (IN) of the shift register (S/R0). Further, the respective output terminals (OUT) of the ten ROMs 1114' are connected to a 10-input OR circuit 1139. The output from the 10-input OR circuit 1139 is ROM data.

Figure 19:
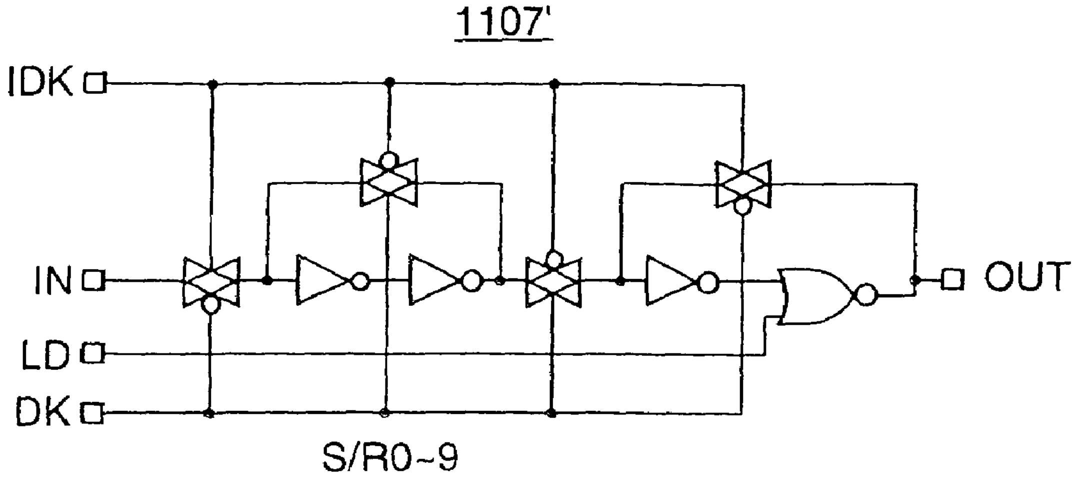
FIG. 19 is a circuit diagram showing the construction of one shift register (S/R0-9) 1107'.

FIG. 19 is a circuit diagram showing the construction of one shift register (S/R0-9) 1107'. As it is understood from comparison between FIG. 19 and FIG. 14, the shift register (S/R0 to S/R9) 1107' of the present embodiment has no input terminal for the output from the ROM, but has the input terminal (IN) for the signal from the previous shift register or the starter 1140, the output terminal (OUT) for outputting a signal to the subsequent shift register or the PAD 1115, the latch signal input terminal (LD), the clock signal input terminal (DK) and the inverted clock signal input terminal (IDK)

Figure 20:
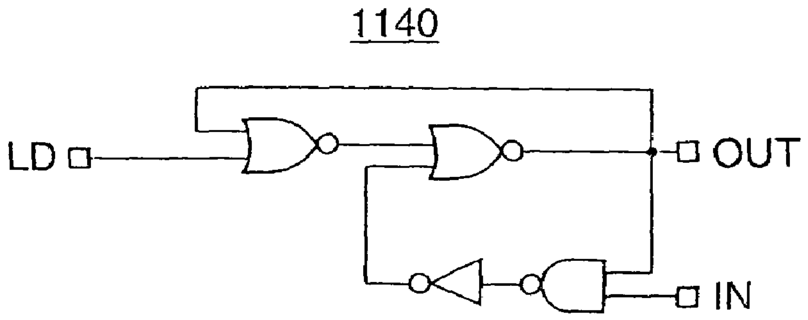
FIG. 20 is a circuit diagram showing the construction of a starter 1140.

FIG. 20 is a circuit diagram showing the construction of the starter 1140. In FIG. 20, a terminal LD is a latch signal (LD) input terminal; a terminal IN, an input terminal to input a feedback signal from the shift register (S/R0) 1107'; and a terminal OUT, an output terminal to output a signal to the shift register (S/R0) 1107'.

Figure 21:
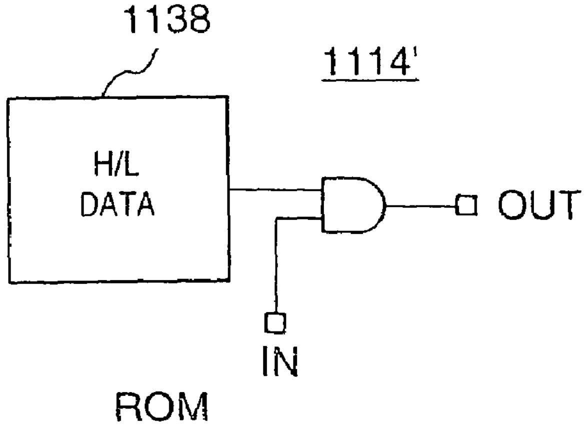
FIG. 21 is a circuit diagram showing the construction of a ROM 1114'.

FIG. 21 is a circuit diagram showing the construction of the ROM 1114'. As it is understood from comparison between the construction in FIG. 21 and that in the example of FIG. 15, the ROM of the present embodiment has an AND circuit in front of the memory device 1138 such that the logical product between the levels of a signal inputted into the input terminal (IN) from the shift register and an output signal from the memory device 1138 is outputted from the output terminal (OUT).

Further, among the ten shift registers in the ROM data output circuit, the first four shift registers (S/R0 to S/R3) output signals to the four inverters 1120 to 1123 of the A/D converter via input nodes 1116 to 1119.

From the differences between the construction of the embodiment of FIGS. 12A to 12C, the route for signal transmission is as follows.

That is, in the embodiment shown in FIG. 12B, the ROM data is transferred to the shift registers of the ROM data output circuit at once, and the clock signal (DCLK2) is inputted into the shift registers for serial data output. On the other hand, in the present embodiment as shown in FIG. 16B, the ROM data is not transferred to the shift registers (S/R0 to S/R9) 1107' but the starter 1140 is used to input a high level "H" signal into the first shift register (S/R0). The output from the shift register (S/R0) is connected to the input terminal (IN) of the corresponding ROM. When the high level "H" signal is applied to the input terminal of the ROM, the signal (H/L) stored in the memory device of the ROM is outputted to the output terminal (OUT).

On the other hand, as the output from the shift register (S/R0) is inputted into the subsequent shift register (S/R1), the output from the subsequent shift register is sequentially transferred to the subsequent shift registers (S/R2, S/R3, . . . ). As a result, data stored in ROM(s) corresponding to shift register(s) which outputted a high level "H" signal are sequentially outputted.

Further, when the output from the shift register (S/R0) is transferred to the subsequent shift register, the outputs from the shift registers (S/R0, S/R1, S/R2 and S/R3) are outputted to the input nodes 1116 to 1119 of the A/D converter, and also used as reference voltage switching signals.

Next, the operation of the printing head having the above construction will be described with reference to the timing chart of FIG. 22.

First, to set the levels of signals stored in all the shift registers (S/R0 to S/R9) 1107', one pulse of the latch signal (LD) is inputted while the signal level of the clock signal (DCLK) is maintained "L". By this operation, signals from the output terminals (OUT) of the shift registers (S/R0 to S/R9) are fixedly at the low level "L".

Next, the starter 1140 is employed to set the input signal to the first shift register (S/R0) to the high level "H". That is, by the input of the latch signal (LD) pulse, the shift register (S/R0) outputs a low level "L" signal, and fed back to the input terminal IN of the starter 1140. On the other hand, after the latch signal (LD) pulse input, the level of the latch signal (LD) is low "L", accordingly, in the construction of the starter 1140 as shown in FIG. 20, the output terminal (OUT) outputs a high level "H" signal. Then, the high level "H" signal is applied to the input terminal (IN) of the shift register (S/R0). In this manner, when the latch signal (LD) is at the low level (i.e., no signal is applied to the PAD 1103), the output from the starter 1140 is constantly at the high level "H".

Figure 22:
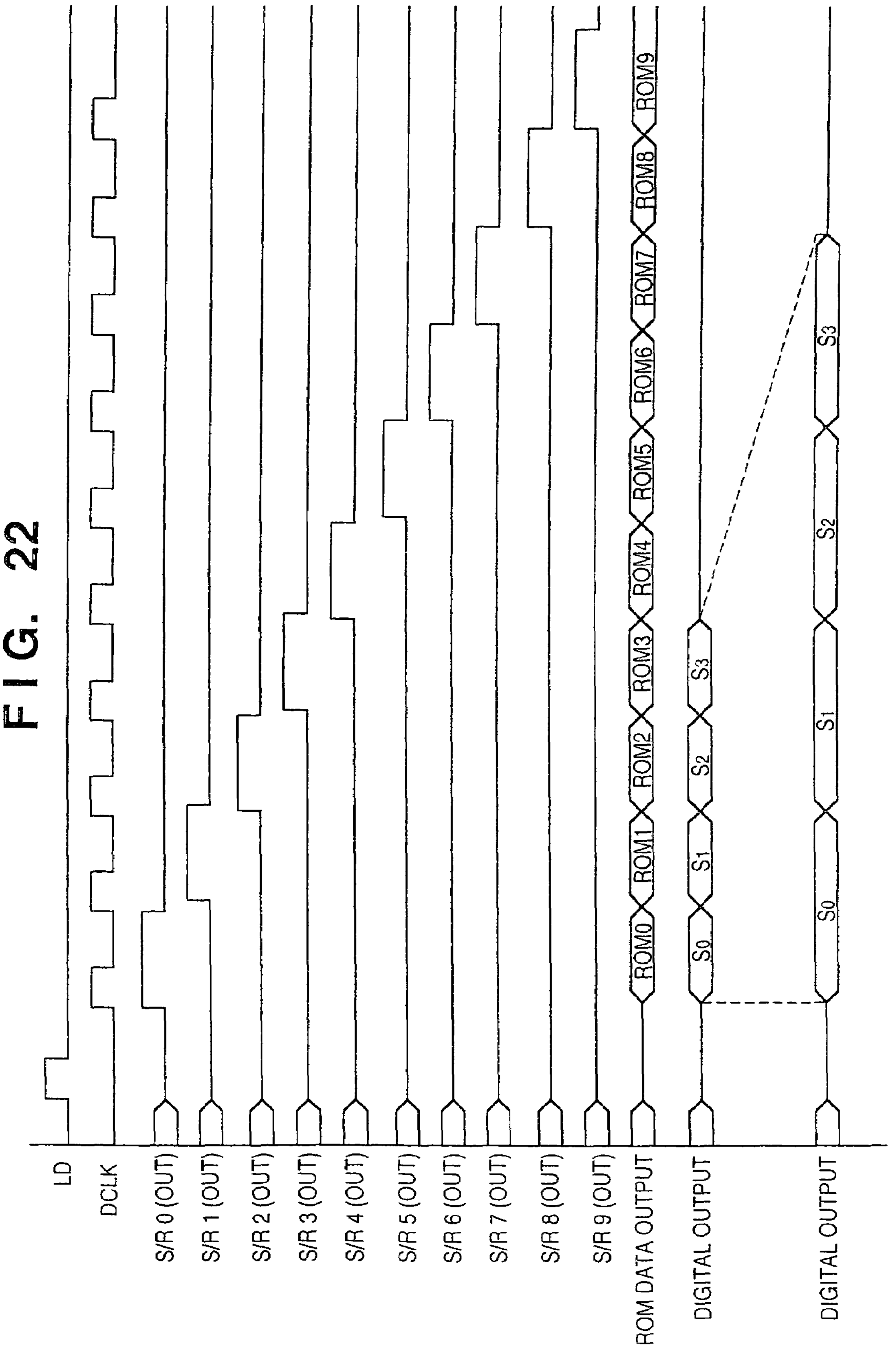
FIG. 22 is a timing chart showing timing of various control signals related to the operation of the printing head.

Next, as shown in FIG. 22, by inputting the pulse of the clock signal (DCLK) from the PAD 1101, the high level "H" signal held in the shift register is sequentially shifted to the subsequent shift registers.

If the high level "H" of the output from the starter 1140 is maintained, the high level "H" signal is stored in all the shift registers (S/R0 to S/R9). Accordingly, the output from the shift register (S/R0) is feed-back inputted into the input terminal (IN) of the starter 1140 such that the high level "H" signal (i.e., 1-bit data) stored in the shift register (S/R0) is sequentially transferred to the subsequent shift registers (S/R1, S/R2, . . . ). That is, the input terminal (IN) of the starter 1140 inputs a high level "H" signal. On the other hand, as the latch signal (LD) inputted into the terminal LD is constantly at the low level "L", the signal level at the output terminal (OUT) of the starter 1140 is fixedly at the low level "L".

Accordingly, as shown in FIG. 22, the high level "H" signal (i.e., 1-bit data) is sequentially shifted to the shift registers (S/R0 to S/R9). As described above, the outputs from the shift registers (S/R0 to S/R9) are connected to respective corresponding ROMs. Only when the output from the shift register (S/R0 to S/R9) is at the high level "H", the corresponding ROM is in a readable state, and the data (H/L data) stored in its memory device is outputted from the output terminal (OUT). Thus, the ROM data outputted from the output terminal (OUT) is inputted into the 10-input OR circuit 1139.

In this manner, since the data is outputted from the ROM only when the output signal from the shift register (S/R0 to S/R9) is at the high level "H", the data are sequentially outputted from the ROMs as shown in FIG. 22.

On the other hand, as the outputs from the shift registers (S/R0 to S/R3) are connected to the input nodes 1116 to 1119 of the A/D converter to input the reference voltage switching signals, digital data is outputted in accordance with the clock signal (DCLK) input.

According to the above-described embodiment, the signal used for ROM data reading control can be also used for heater drive control, and the digital data such as information on printing head internal temperature is outputted by using the image signal (DATA) transfer clock (DCLK). Accordingly, the number of control signals inputted into the printing head can be reduced, and the number of input/output pads provided on the substrate of the printing head can be reduced.

This arrangement, which realizes reduction of the area of the substrate of the printing head and simplification of the substrate, contributes to the downsizing of the apparatus and cost reduction. Further, the reduction of the number of pads leads to reduction of the number of pointing wires with external contacts, thus reduces costs. Further, the reduction of the number of control signal lines accompanying the reduction of the number of pads leads to improvement in reliability of the apparatus and cost reduction.

In the above-described embodiment, the output frequency of the digital signal outputted from the A/D converter is the same as that of the ROM data as shown in FIG. 22. In the following modification, the output frequency of the digital signal is lower than the ROM data output frequency.

Figures 23A, 23B, 23C, 23D:
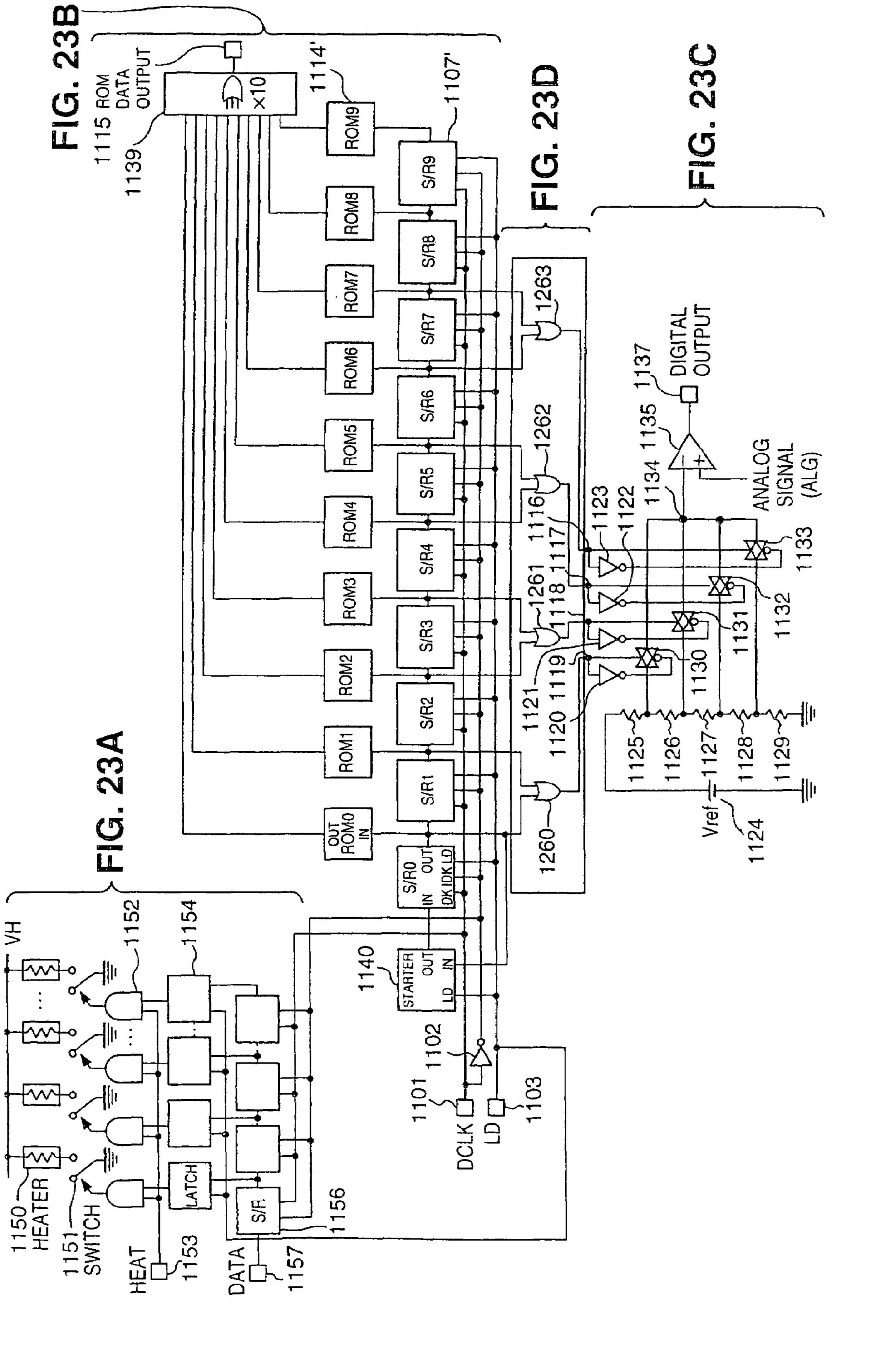
FIGS. 23A to 23D are circuit diagrams showing the construction of substrate installed in the printing head IJH according to a modification.

FIGS. 23A to 23D are circuit diagrams showing the arrangement of the substrate installed in the printing head IJH according to the modification. In FIGS. 23A to 23C, elements of the substrate of the printing head and signals corresponding to those described with reference to FIGS. 16A to 16C and FIGS. 12A to 12C have the same reference numerals and explanations of the elements and signals will be omitted. The element characterizing the modification and its operation, especially the difference from the above embodiment, will be described below. FIG. 23A shows the heater driver corresponding to the heater driver in FIG. 16A. FIG. 23B shows the ROM data output circuit corresponding to the ROM data output circuit in FIG. 16B. FIG. 23C shows the A/D converter corresponding to the A/D converter in FIG. 16C.

As it is apparent from comparison between FIGS. 23A to 23C and FIGS. 16A to 16C, the substrate of the modification has a clock rate switching circuit (FIG. 23D) between the ROM data output circuit and the A/D converter.

Next, the construction and operation of the clock rate switching circuit will be described with reference to FIGS. 23D and the timing chart of FIG. 22.

As shown in FIG. 23D, in the clock rate switching circuit, outputs from four pairs of shift registers ((S/R0 and S/R1), (S/R2 and S/R3), (S/R4 and S/R 5) and (S/R6 and S/R7)) are inputted into four OR gates 1260 to 1263, such that the frequency of signal output from the shift register synchronized with the clock signal (DCLK) is ½. Then, the outputs from the OR gates are connected to the input nodes 1116 to 1119 for the reference voltage switching signals, and similarly to the above-described second embodiment, in accordance with a selected reference voltage, the input analog signal (ALG) is converted into digital data and outputted from the PAD 1137.

In the above construction, in the modification, the A/D conversion is performed while the operation speed of the comparator 1135 is reduced. Generally, if the comparator's switching speed is increased, i.e., the operation frequency is increased, the electric consumption of the circuit increases. Accordingly, it is desirable to suppress heat generation of the circuit accompanying the increase in the electric consumption as much as possible for maintain normal operation of the printing head.

According to the above-described second embodiment, the comparator's switching speed is reduced to control temperature rise of the substrate, so as to maintain excellent operation of the printing head.

Further, the comparator's switching speed can be further reduced by increasing the number of shift register output signals inputted into one OR gate to two or more.

Third Embodiment

Next, a third embodiment of the printing head of the present invention will be described.

Figure 24:
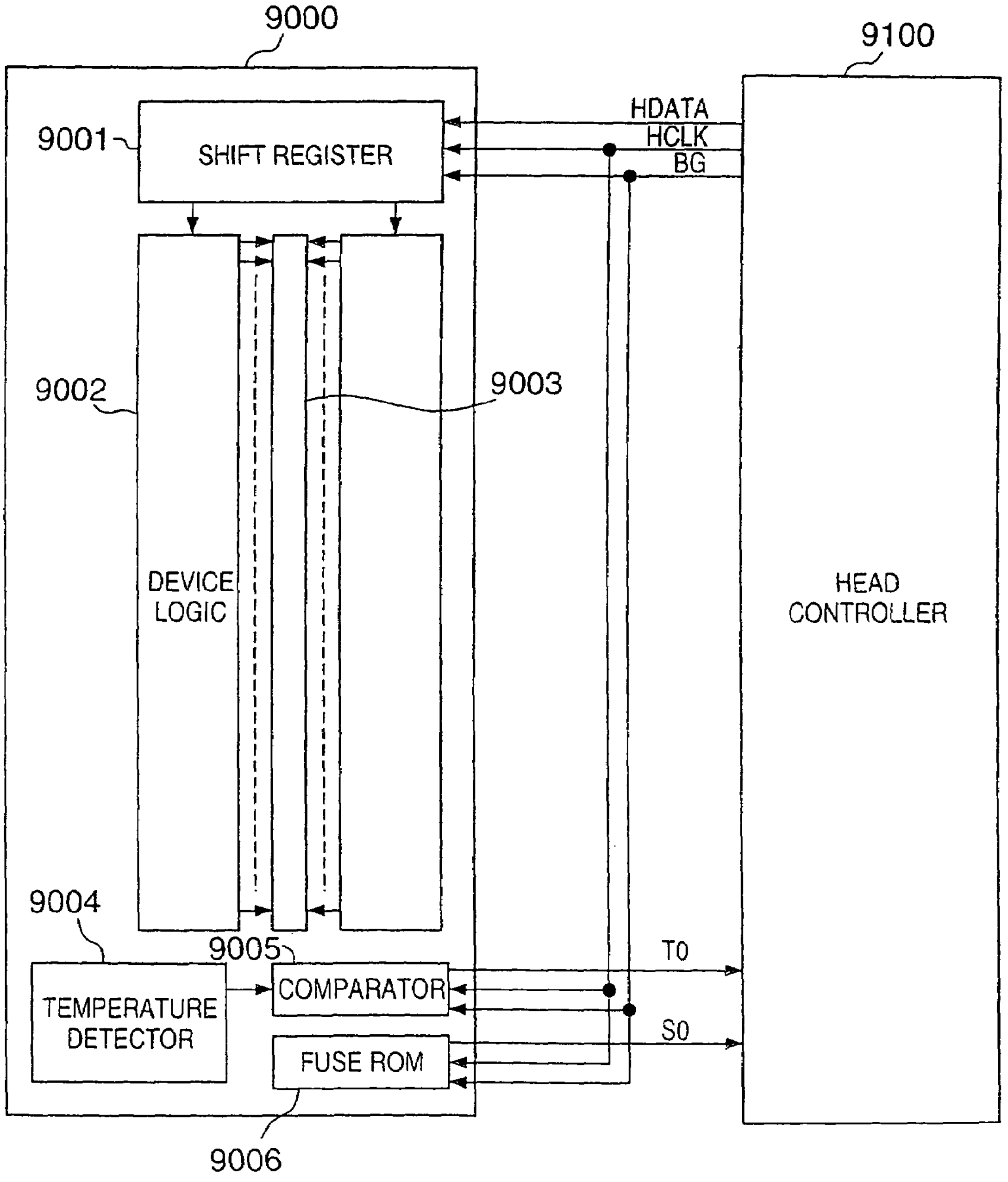
FIG. 24 is a block diagram showing connection between the printing head and a head controller according to a third embodiment of the present invention.

FIG. 24 is a block diagram showing electrical connection between the printing head of the embodiment and a head controller 9100 of the printing apparatus main body. For simplification of description, only signals related to data transfer are shown.

In FIG. 24, numeral 9000 denotes a semiconductor substrate (base plate) as a part of the printing head for ink discharge control for one color. Numeral 9001 denotes a shift register which latches data transferred by a print data signal HDATA from the controller 9100, a transfer clock HCLK and a latch signal BG, and supplies the data to a drive logic circuit 9002.

The drive logic circuit 9002 drives electrothermal transducers (heaters) in nozzles 9003 to discharge ink, in accordance with the data from the shift register 9001. Numeral 9004 denotes a temperature detector which changes the level of an output signal in an analog fashion in accordance with the temperature of the semiconductor substrate 9000. Numeral 9005 denotes a comparator which sequentially selects one of a plurality of reference voltages, compares the selected reference voltage with the output from the temperature detector 9004, and outputs the result of comparison as a signal TO having "1" or "0" digital information.

Numeral 9006 denotes a fuse ROM as a memory for storing information on the printing head. A plural-bit information indicative of identification (ID) and/or rank, previously written by melt-breakage of a resistor is stored in the fuse ROM. By sequentially changing a pointer value, the stored information is outputted by 1 bit as a signal SO.

Note that the memory is not limited to the fuse ROM, but other formats of memories such as an EPROM and an EEPROM may be employed as the nonvolatile memory.

Figure 25:
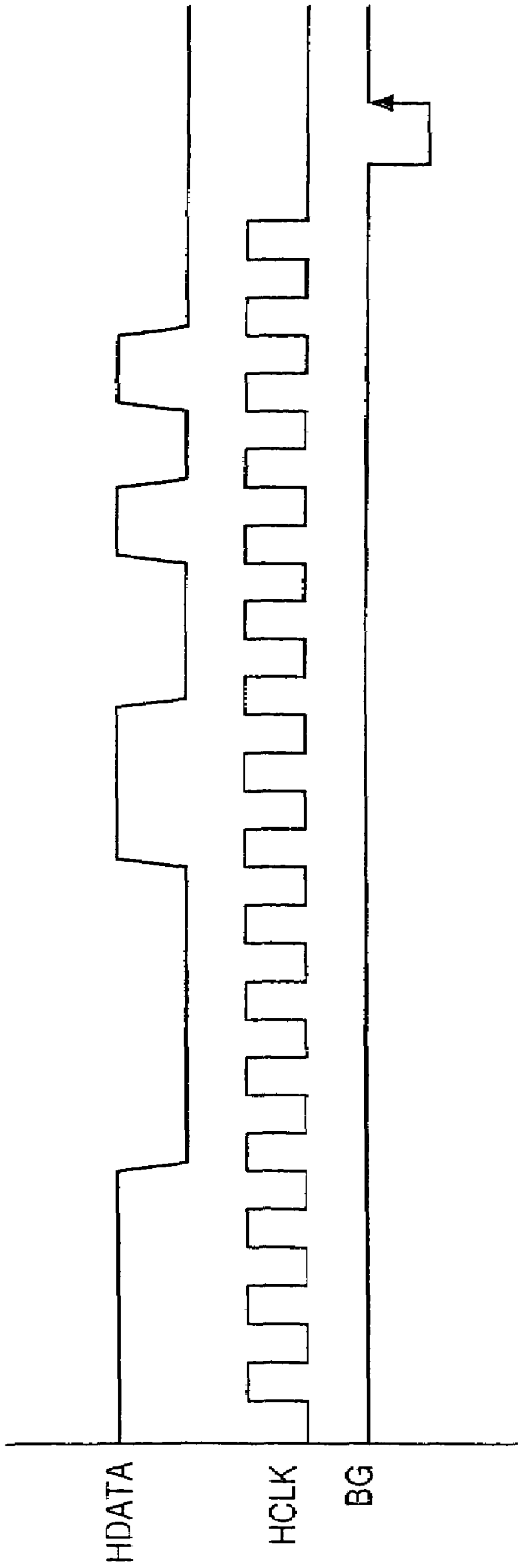
FIG. 25 is a timing chart showing timing of print data transfer.

FIG. 25 is a timing chart showing condition of HDATA, HCLK and BG signals upon print data transfer. In this example, 16-bit print data "f0cah" (1111000011001010B) is transferred.

With each rise of the HCLK signal, the state of the HDATA signal ("1" or "0" 1-bit data) is inputted into the shift register 9001, and at the same time, a head controller 9100 selects the next bit data as the HDATA. This operation is repeated until 16-bit data have been inputted into the shift register 9001. Then the BG signal becomes "Low", and at the rising edge of the BG signal to be "High" again, the 16-bit data is latched by the shift register 9001.

Figure 26:
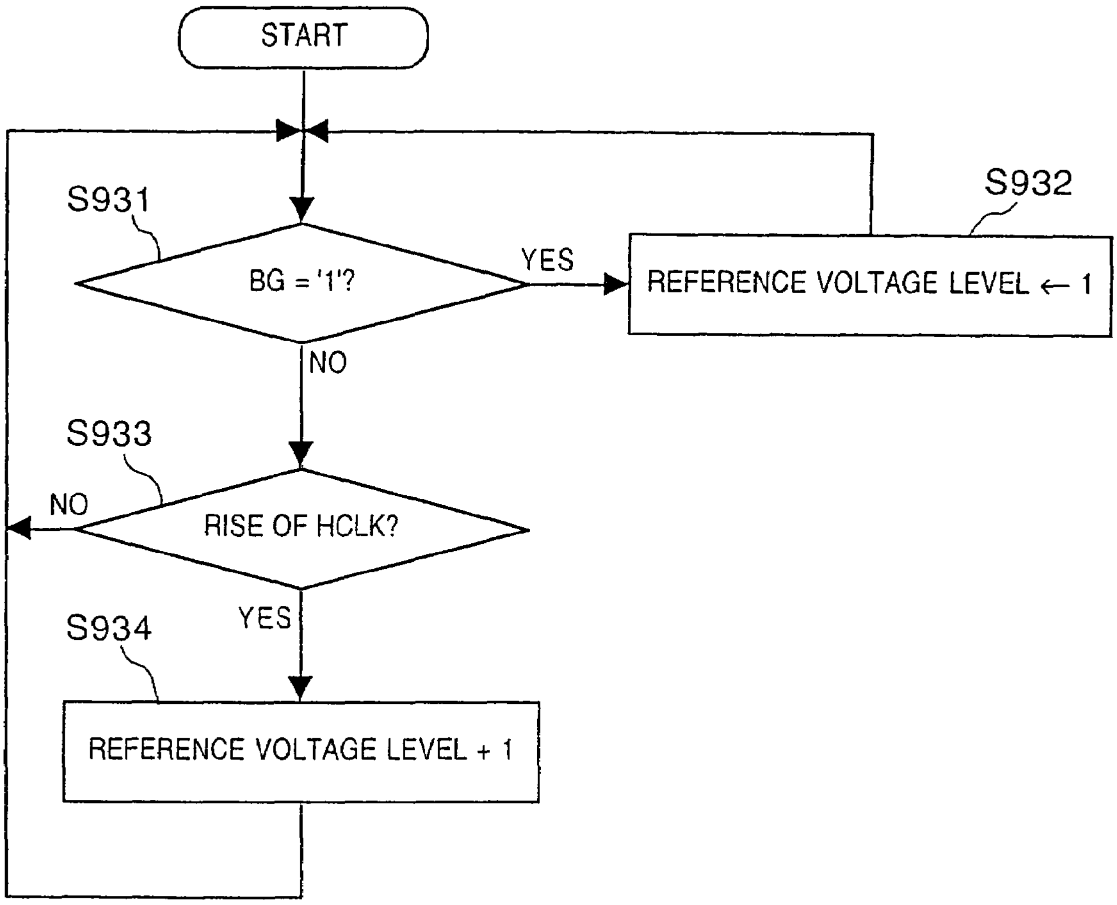
FIG. 26 is a flowchart showing the operation of a comparator.

FIG. 26 is a flowchart showing the operation of reference voltage selection in the comparator 9005. First, it is determined whether or not the value of the signal BG is "1" (step S931). If the value of the BG signal is "1", the level of the reference voltage is reset to an initial state level "1" (step S932). If it is determined at step S931 that the value of the signal BG is "0", it is determined whether or not the rising edge of the HCLK signal has been detected (step S933). If the rising edge of the HCLK signal has been detected, the reference voltage level is incremented (step S934), then the process returns to step S931.

That is, in a state where the value of the BG signal is "0", every time the rising edge of the HCLK signal has been detected, the reference voltage level is incremented. Then, the information on the temperature of the semiconductor substrate 9000 of the printing head can be obtained from the number of rising edges (the number of pulses) of the HCLK signal since the value of the BG signal became "1" to a point where the output signal TO from the comparator 9005 changes.

Figure 27:
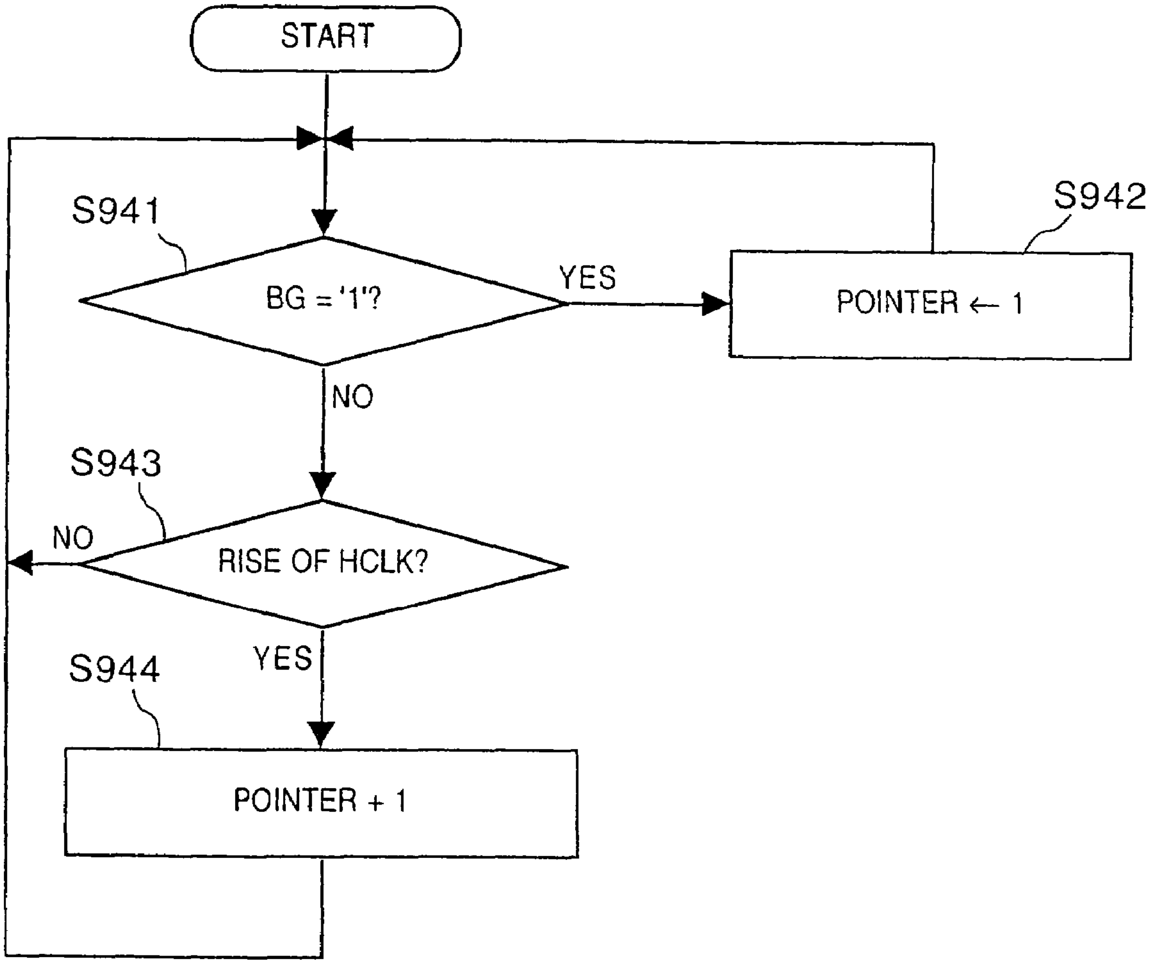
FIG. 27 is a flowchart showing the operation of a fuse ROM.

FIG. 27 is a flowchart showing the operation of pointer changing in the fuse ROM 9006. First, it is determined whether or not the value of the BG signal is "1" (step S941). If the value of the BG signal is "1", a pointer value is returned to an initial state value "1" (step S942). If it is determined at step S941 that the value of the BG signal is "0", it is determined whether or not the rising edge of the HCLK signal has been detected (step S943). If the rising edge of the HCLK signal has been detected, the pointer is incremented (step S944), then the process returns to step S931.

That is, in a state where the value of the BG signal is "0", every time the rising edge of the HCLK signal has been detected, the pointer is incremented, and data is outputted by 1 bit as the signal SO from the ROM 9006. Thus, the plural bit information indicative of the ID and/or rank of the printing head is serially outputted.

Figure 28:
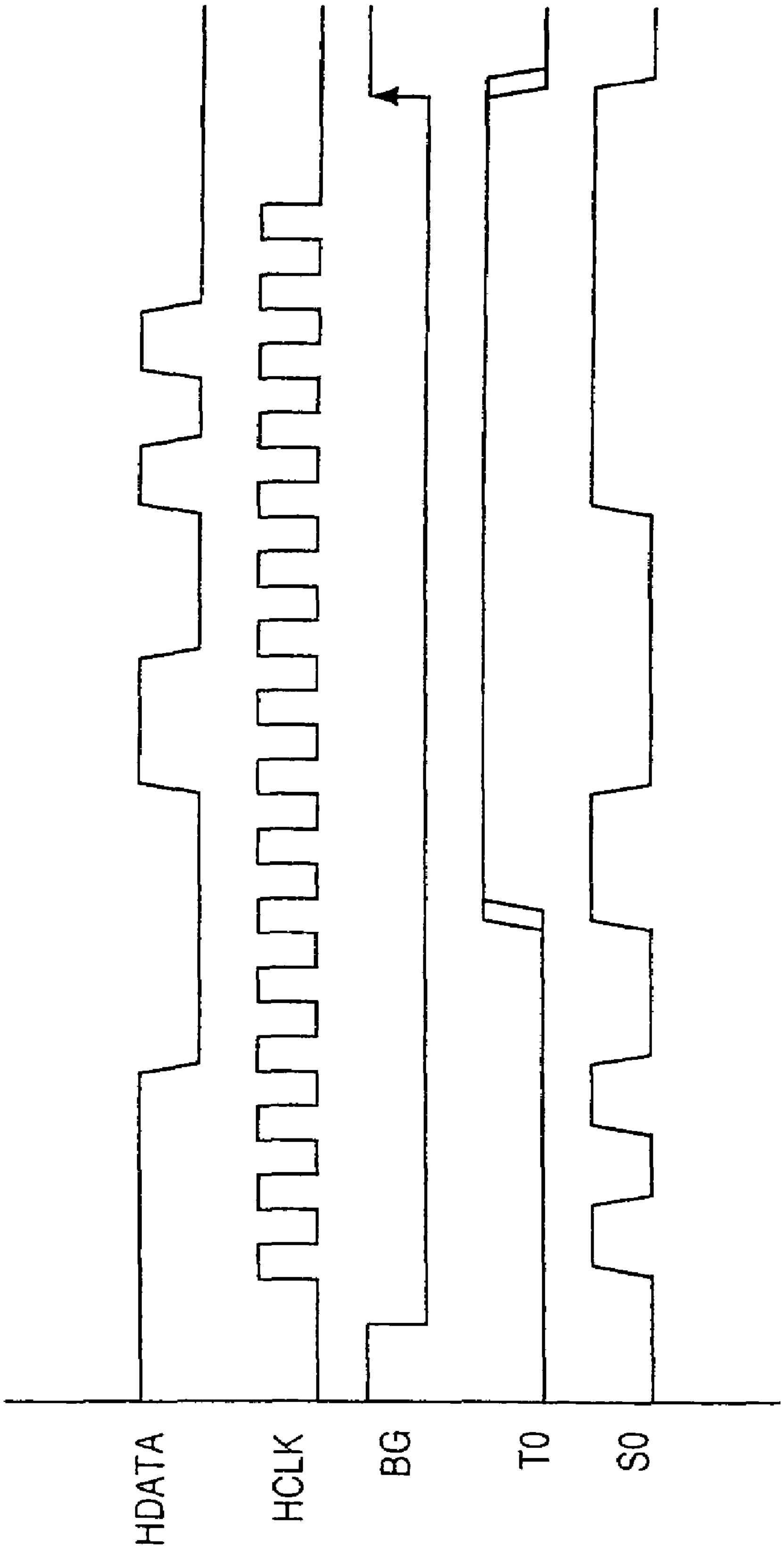
FIG. 28 is a timing chart showing timing of transmission of printing head information with print data.

FIG. 28 is a timing chart showing condition of various signals in print data transfer to the printing head and that from the printing head, performed simultaneously. The print data transferred here is the same as that shown in FIG. 25.

In this case, different from the case where only the print data is transferred as shown in FIG. 25, the value of the signal BG is "0" during the print data transfer. By this arrangement, at the same time of the print data transfer, the information on the printing head temperature, information on the ID and/or rank can be outputted from the semiconductor substrate 9000 of the printing head. When the rising edge of the signal BG has been detected to latch the transferred print data, the signals TO and SO are reset to the initial values.

As described above, in the present embodiment, the print data transferred to the printing head is 16-bit data, and the information transferred from the printing head as the signals SO and TO are also 16-bit data. If the print data is 32-bit data, the information transferred from the printing head is also 32-bit data. Further, if the amount of information transferred from the printing head is smaller than the number of bits of the print data, corresponding control such as delaying the rising timing of the signal BG can be performed.

Fourth Embodiment

Next, a fourth embodiment of the printing head of the present invention will be described.

Figure 32:
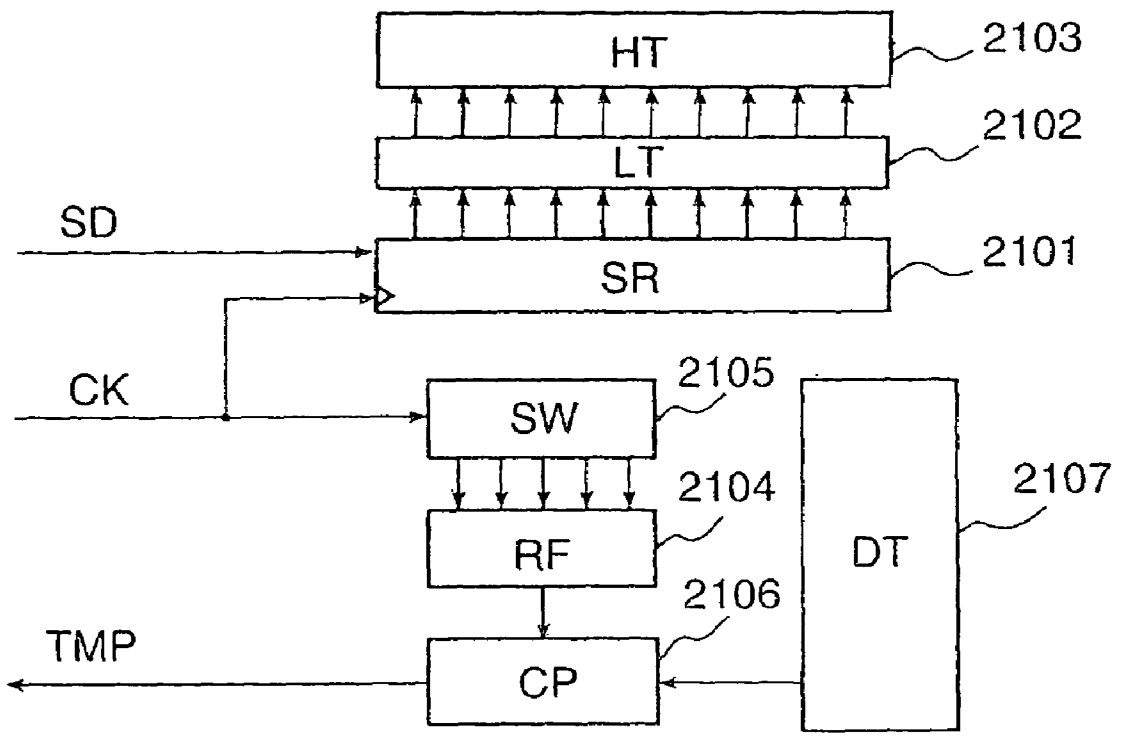
FIG. 32 is a block diagram showing the construction of the printing head.

FIG. 32 is a block diagram showing the circuit arrangement for transmitting detected temperature data to the outside in synchronization with input print data formed on the substrate of the printing head.

In FIG. 32, print data (SD) is inputted as serial data synchronized with a shift clock signal (CK) into a shift register (SR) 2101 and temporarily stored there. Further, the stored print data is latched by a latch circuit (LT) 2102. Then, a heater (HT) 2103 is energized and heated based on the latched print data.

On the other hand, the shift clock signal (CK) is inputted into a switching circuit (SW) 2105 to control a reference voltage generator (RF) 2104 constituting a temperature detector provided on the substrate, and the signal is employed to vary the reference voltage by 1 clock. Then, a comparator (CP) 2106 compares the reference voltage and an output voltage from a temperature detection sensor (DT) 2107 provided around the heater (HT), and transmits the result of comparison as digital data of "0" or "1" to the outside of the substrate.

As described above, this temperature detection, which instantly digitizes the information on detected temperature and transmits the digitized information, is resistant to noise at wiring between the printing head and the printing apparatus carrying the printing head. Further, an A/D converter or any other circuit outside the printing head can be omitted. Further, the transfer of print data and the acquisition of temperature data can be performed simultaneously, there is no timing loss for information acquisition.

Figure 29:
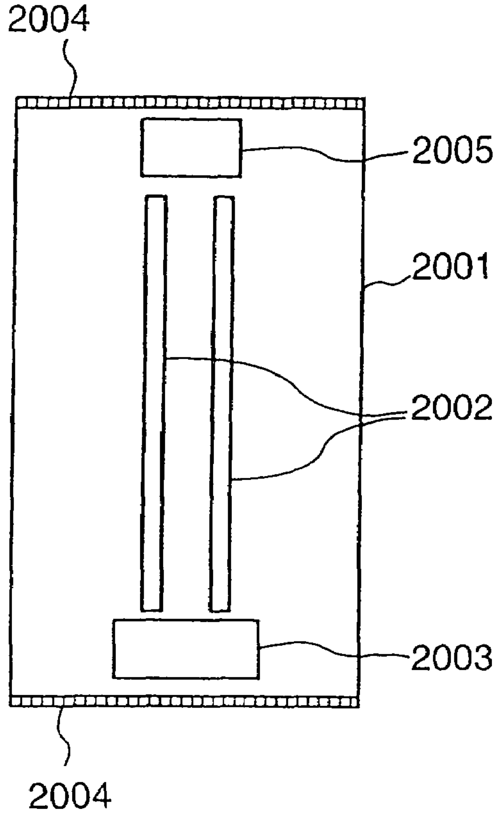
FIG. 29 is a schematic diagram showing the surface of the substrate of the printing head IJH according to a fourth embodiment of the present invention.

FIG. 29 is a schematic diagram for improving the arrangement of the embodiment shown in FIG. 32 formed on the substrate (base plate) of the printing head IJH.

In FIG. 29, numeral 2001 denotes a substrate; 2002, two heater arrays to heat ink; 2003, a logic circuit including a shift register and a latch circuit; 2004, a contact pad array to be in press-contact with contacts in the carriage HC of the printing apparatus when the printing head IJH is attached to the carriage HC; and 2005, a temperature detection circuit including a sensor to detect the temperature of the substrate.

Figure 30:
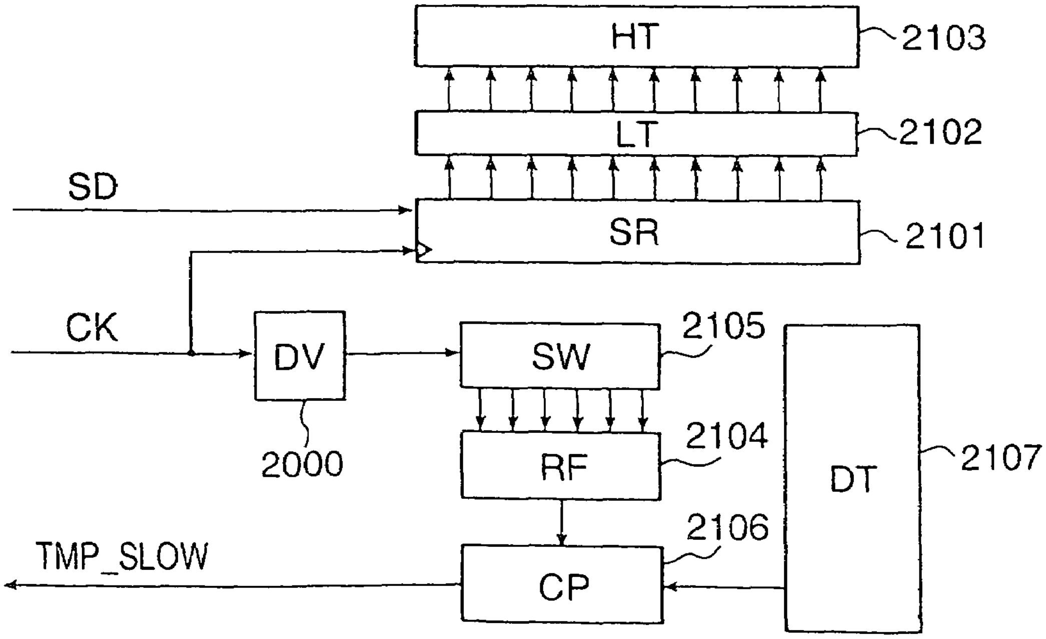
FIG. 30 is a block diagram showing the arrangement of circuits packaged on the substrate of the printing head.
Figure 31:
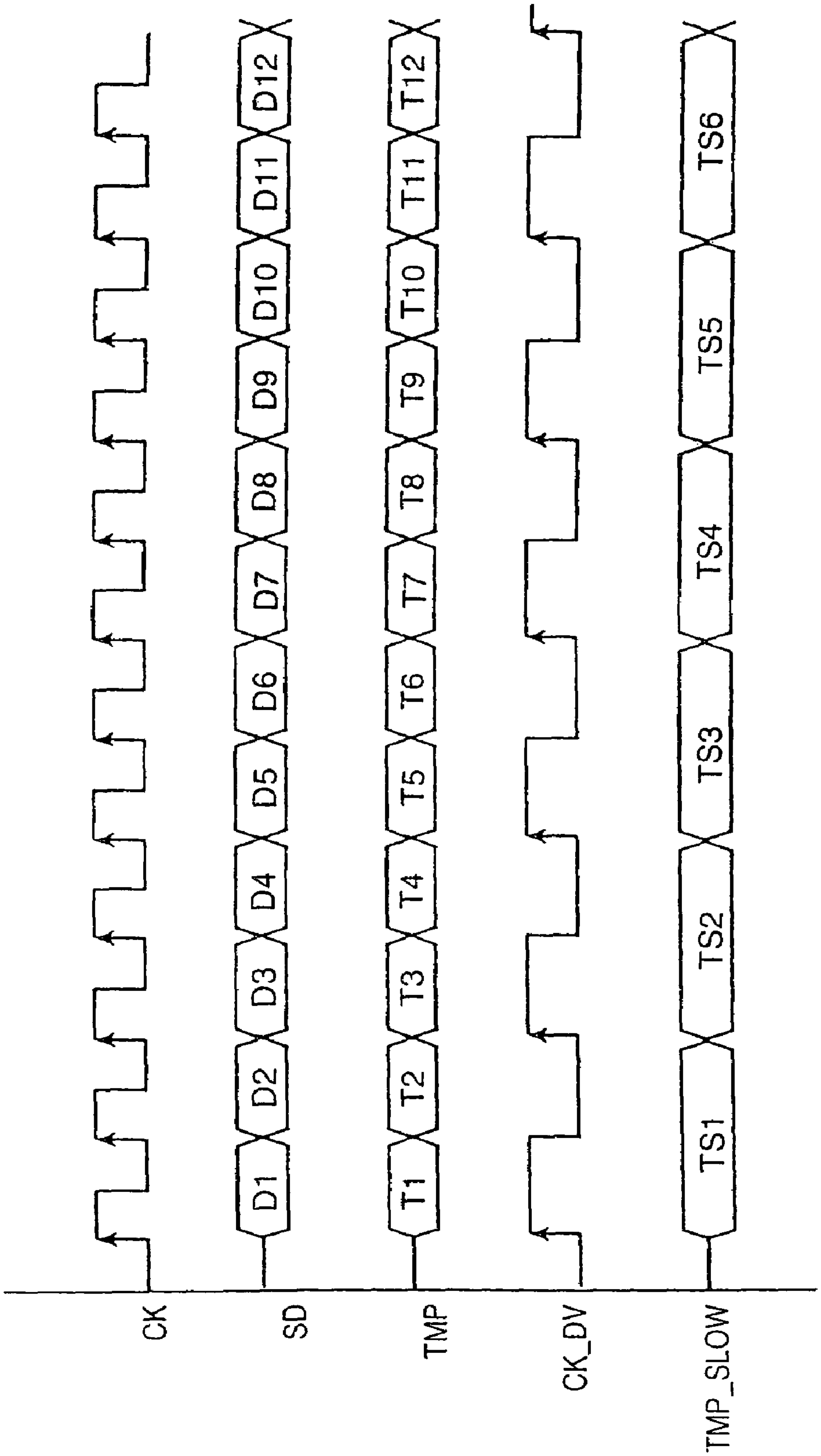
FIG. 31 is a timing chart showing timing of various signals handled by the circuits in FIG. 30.

FIG. 30 is a block diagram showing the arrangement of built-in circuits on the substrate of the printing head. FIG. 31 is a timing chart showing timing of various signals handled by the circuits in FIG. 30. In FIG. 30, elements and signals corresponding to those described in FIG. 32 have the same reference numerals and explanations of the elements and signals will be omitted. Further, for comparison with FIG. 32, FIG. 31 shows a signal (TMP) indicative of information on detected temperature outputted from the circuit as shown in FIG. 32.

In comparison with the construction in FIG. 32, in the construction of the present embodiment in FIG. 30, a frequency divider (DV) 2000 is provided to divide the frequency of the shift clock signal (CK) to obtain a clock signal (CK_DV) before the shift clock is inputted input the reference voltage switching circuit (SW) 2105.

In the above construction, as shown in FIG. 31, when the shift clock (CK) is inputted, the frequency divider 2000 divides the frequency of the shift clock by 2, and outputs a clock signal (CK_DV) having a doubled frequency. Then, the reference voltage switching circuit (SW) 2105 performs switching operation to vary the reference voltage in accordance with the clock signal (CK_DV) with ½ frequency. By this arrangement, the operation speed of the comparator (CP) 2106 to compare the output from the temperature sensor to the reference voltage becomes ½.

Accordingly, as shown in FIG. 31, a signal (TMP_SLOW) indicative of information on detected temperature outputted from the comparator (CP) 2106 is transmitted as TS1, TS2, . . . by two clocks of the original shift clock signal (CK). In this case, the information on detected temperature can be obtained at a speed ½ of print data input speed. This speed is ½ of the speed to transmit the conventional signal (TMP) indicative of information on detected temperature.

On the other hand, the print data (SD) is inputted as D1, D2, D3, . . . into the shift register (SR) 2101, in accordance with the frequency of the shift clock signal (CK).

According to the above-described embodiment, as the temperature information can be obtained at a speed ½ of the print data input speed, even if the print data input speed is doubled, the temperature information can be obtained at the same speed as the conventional speed. Thus, high-speed printing can be ensured by increasing the print data input speed, while the analog circuits such as the comparator and the switching circuit can be operated at the same speed as the conventional speed. In this arrangement, the electric consumption of the analog circuits does not increase. Further, it is not necessary to increase the speed of the operations of the analog circuits.

Note that in the above-described embodiment, the frequency of the input shift clock signal is divided by 2, however, the present invention is not limited to this frequency division. For example, the frequency divider may generate a clock signal having a frequency ⅓ or ¼ of that of the input shift clock signal.

Each of four embodiments described above can be applied independently, however, it is also possible to combine these embodiments. For example, each of the A/D converters in the second to fourth embodiments may be formed on the same substrate (base plate) having the thermal transducer (heater) for generating thermal energy, the driver for driving the thermal transducer, and a sensor for detecting the temperature of the substrate by the semiconductor manufacturing process, as described in the first embodiment. And also, each of the clock signals used for reading the information from the memory in the second and the third embodiments may be obtained by dividing the clock signal used for inputting the print data, as described in the forth embodiment.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change-in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A method for outputting information from a printing head, comprising the steps of:

providing a printing head which has a memory for storing information of the printing head, a converter which converts an analog signal into a digital signal and outputs the digital signal, a driver which drives a plurality of printing elements in accordance with an input print signal, a first shift register to which the print signal is inputted by using a clock signal, a latch circuit which holds the print signal inputted to the first shift register, and a second shift register which is connected to the memory;

printing by utilizing the printing head in accordance with the print signal which is held by the latch circuit and a heat signal;

serially outputting the information from the second shift register connected to the memory to the outside of the printing head by utilizing the clock signal used for inputting the print signal to the first shift register; and outputting the digital signal from the converter by using the clock signal.

2. A method for outputting information from a printing head, comprising the steps of:

providing a printing head which has a nonvolatile memory for storing information on the condition of the printing head, a first shift register to which a print signal is inputted by using a clock signal, a latch circuit which holds the print signal inputted to the first shift register, and a second shift register which is connected to the nonvolatile memory;

printing by utilizing the printing head with the print signal which is held by the latch circuit and a heat signal; and serially outputting the information from the second shift register connected to the nonvolatile memory to the outside of the printing head, by utilizing a clock signal used for inputting the print signal, within a period in which the print signal is inputted.

* * * * *